(12) United States Patent
Allgeier et al.

(10) Patent No.: US 12,505,084 B2
(45) Date of Patent: Dec. 23, 2025

(54) REALTIME DATA SUMMARIZATION AND AGGREGATION WITH CUBES

(71) Applicant: NextWorld LLC, Denver, CO (US)

(72) Inventors: Axel Allgeier, Denver, CO (US); Luke Hollenback, Denver, CO (US)

(73) Assignee: NextWorld, LLC, Greenwood Village, CO (US)

( * ) Notice: Subject to any disclaimer, the term of this patent is extended or adjusted under 35 U.S.C. 154(b) by 440 days.

(21) Appl. No.: 16/817,949

(22) Filed: Mar. 13, 2020

(65) Prior Publication Data

US 2021/0248121 A1 Aug. 12, 2021

Related U.S. Application Data

(60) Provisional application No. 62/975,522, filed on Feb. 12, 2020.

(51) Int. Cl.
*G06F 16/22* (2019.01)
*G06F 16/2455* (2019.01)

(52) U.S. Cl.
CPC .... *G06F 16/2264* (2019.01); *G06F 16/24556* (2019.01)

(58) Field of Classification Search
CPC .......... G06F 16/2264; G06F 16/24556; G06F 16/283; G06Q 10/0637
USPC ........................................................ 707/741
See application file for complete search history.

(56) References Cited

U.S. PATENT DOCUMENTS

| | | | | |
|---|---|---|---|---|
| 9,081,830 B1 * | 7/2015 | Stolte | ..................... | G06F 16/248 |
| 9,501,585 B1 * | 11/2016 | Gautam | .................. | G06F 16/26 |
| 10,019,472 B2 * | 7/2018 | Khandelwal | ........ | G06F 16/2264 |
| 11,941,031 B2 * | 3/2024 | Gudmundson | ..... | G06F 16/2452 |
| 2004/0078300 A1 * | 4/2004 | Smith | ................ | G06Q 30/0601 |
| | | | | 705/26.1 |
| 2006/0229938 A1 * | 10/2006 | Yan | ........................ | G06Q 30/02 |
| | | | | 705/14.71 |
| 2007/0061611 A1 * | 3/2007 | Mackinlay | .......... | G06F 16/2393 |
| | | | | 714/5.1 |

(Continued)

OTHER PUBLICATIONS

"Data Cubes", http://www2.cs.uregina.ca/~dbd/cs831/notes/dcubes/dcubes.html, 8 pages.

(Continued)

*Primary Examiner* — Pierre Vital

(57) ABSTRACT

Various embodiments of the present technology generally relate to generating decisional data from organizational data. More specifically, some embodiments relate to aggregating and summarizing organizational data into cubes of decisional data in a no-code development environment. In one embodiment of the present technology, a method of providing decisional data to endpoints comprises aggregating organizational data into a cube of decisional data, wherein the cube is a multidimensional dataset comprising the decisional data. The method further comprises receiving a cube query from an endpoint, wherein the cube query is related to at least a portion of the decisional data in the cube and comprises metadata related to the cube, generating cube query results, wherein the cube query results comprise a summarized portion of the decisional data in the cube, and returning the cube query results to the endpoint.

20 Claims, 20 Drawing Sheets

(56) References Cited

U.S. PATENT DOCUMENTS

| | | | |
|---|---|---|---|
| 2011/0320398 A1* | 12/2011 | Abdellatif Abouzeid | ................... G06F 16/2453 707/600 |
| 2012/0130940 A1* | 5/2012 | Gattani | ............... G06F 16/9024 707/791 |
| 2014/0351233 A1* | 11/2014 | Crupi | ................ G06F 16/24568 707/706 |
| 2015/0278334 A1* | 10/2015 | Gerweck | ............... G06F 16/283 707/706 |
| 2017/0032458 A1* | 2/2017 | Dembo | ................... G06Q 40/02 |
| 2019/0220464 A1* | 7/2019 | Butani | ............... G06F 16/24542 |
| 2020/0026709 A1* | 1/2020 | Ramaiyer | ........... G06F 16/2455 |

OTHER PUBLICATIONS

"Dala Warehouse", https://en_wikipedia.org/wiki/Dala_warehouse, 11 pages.
"Data Warehousing—Concepts", https://www.tutorialspoint.com/dwh/dwh_data_warehousing.htm, 2 pages.
"OLAP Cube", https://en.wikipedia.org/wiki/OLAP_cube, 5 pages.
Chen, Bee-Chung , et al., "Prediction Cubes", http://pages.cs.wisc.edu/~beechung/papers/pcube-vldb.final.v5.pdf, 12 pages.

* cited by examiner

1005

| Year != null | Week != null | Type != null | Project != null | Scrum Team = null | Status(From) = null | Status(To) = null | Count |
|---|---|---|---|---|---|---|---|
| 2019 | 2 | Bug | NW1 | | | Init | 2 |
| 2019 | 2 | Story | NW1 | | | Init | 3 |
| 2019 | 3 | Bug | NW1 | 1006 | | Init | 5 |
| 2019 | 3 | Story | NW1 | | | Init | 5 |
| 2019 | 4 | Bug | NW1 | | | Init | 1 |
| 2019 | 4 | Story | NW1 | | | Init | 4 |
| | | | | | | | 20 |

1010

| Year = 2019 | Week = 3 | Type = Bug | Project = NW1 | Scrum Team != null | Status(From) = null | Status(To) = Init | Count |
|---|---|---|---|---|---|---|---|
| 2019 | 3 | Bug | NW1 | Server | 1011 | Init | 3 |
| 2019 | 3 | Bug | NW1 | Client | | Init | 2 |
| | | | | | | | 5 |

1015

| Year = 2019 | Week = 3 | Type = Bug | Project = NW1 | Scrum Team = Server | Status(From) != null | Status(To) = Init | Count |
|---|---|---|---|---|---|---|---|
| 2019 | 3 | Bug | NW1 | Server | {none} 1016 | Init | 3 |
| | | | | | | | 3 |

1020

| Year = 2019 | Week = 3 | Type = Bug 1021 | Project = NW1 | Scrum Team = Server | Status(From) = {none} | Status(To) = Init | Count |
|---|---|---|---|---|---|---|---|
| 2019 | 3 | Bug | NW1 | Server | {none} | Init | 3 |
| | | | | | | | 3 |

1025

| Year = 2019 | Week = 3 | Type != null | Project = NW1 | Scrum Team = Server | Status(From) = null | Status(To) = Init | Count |
|---|---|---|---|---|---|---|---|
| 2019 | 3 | Bug | NW1 | Server | {none} | Init | 3 |
| 2019 | 3 | Story | NW1 | Server | {none} | Init | 4 |
| | | | | | | | 7 |

FIGURE 10

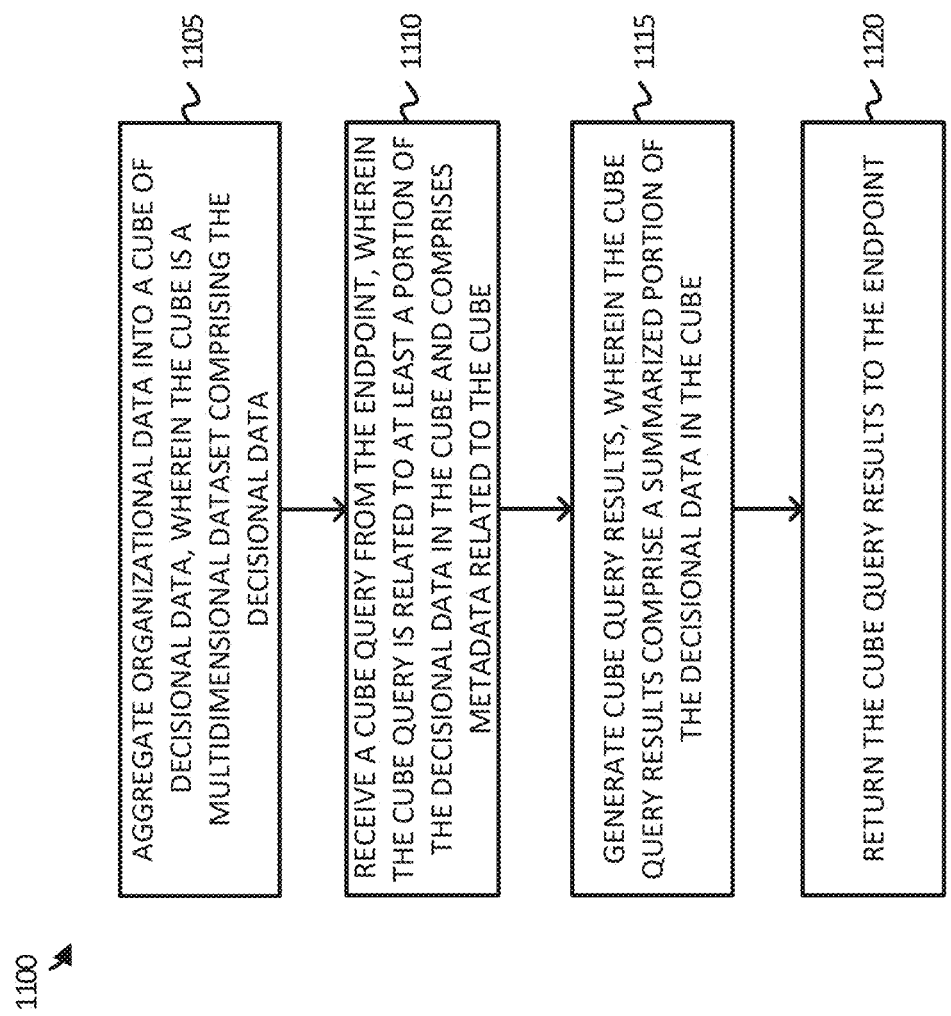

| Cubes | PENDING WORK | ⊚ DEBUG ▼ | | | | ⌕ ACTIONS ▼ | + CREATE | ⌕ SEARCH ▼ | ⟳ REFRESH | × CLOSE |
|---|---|---|---|---|---|---|---|---|---|---|
| ⊕ | | MODE | CUBE | # OBJECT STATUS ▼ | # FAMILY ▼ | # STATUS ▼ | DESCRIPTION | SECURITY GROUP EXACT MATCH | OWNER |
| △ | ⌕ | | ExampleAgileTasks | ⌂ Available | ⊙ Test | ⊙ New | Provides an example Definition of a Cube built | nwToolsOpen | _base |
| △ | ⌕ | | ExampleAgileTasksBase | ⌂ Available | ⊙ Test | ⊙ New | Provides an example Definition of a Cube built | nwToolsOpen | _base |
| △ | ⌕ | | ExampleBalancesCube | ⌂ Available | ⊙ Test | ⊙ New | An example of a Cube that summarizes financial data | nwToolsTesting | _base |
| 3 | | | | ≪ ◁ ▯ ▷ ▶  15 ▼ | | | | | COLUMNS ▼ |

Cubes ⊞ DEBUG▼ | ☐ OPEN LOADER|▼ | ☐ SAVE AND EXIT|▼ | × CANCEL

HEADER

| CUBE * ⊚ | DESCRIPTION ⊚ | TRANSITIONAL TABLE ⊚ | STATUS * ⊚ |
|---|---|---|---|
| ExampleBalancesCube | An example of a Cube that summariz | ExampleBalancesCubeTransitionalTable 🔍 | ⊙ NEW |

| OBJECT MODE ⊚ | CONTINUOUS TABLE * ⊚ | | SECURITY GROUP * ⊚ |
|---|---|---|---|
| ⊙ Update | ExampleBalancesCubeContinuousTable 🔍 | | nwToolsTesting |

| INIT START ⊚ | INIT LAST PROCESSED ⊚ | CURRENT SIZE (GB) ⊚ | |
|---|---|---|---|
| M/D/YYYY, H:MM A | M/D/YYYY, H:MM A | | |

General | Data | Dimensions | Metrics | Control

1235

CONFIGURATION

METRICS ⊚

| ⊚ ▽ | | TABLE * ⊚ | STATE LOOKUP * ⊚ | STATE TYPE LOOKUP * ⊚ | TYPE * ⊚ | FROM STATE * ⊚ | FROM STATE TYPE ⊚ | TO STATE * ⊚ |
|---|---|---|---|---|---|---|---|---|
| ✓ | 📄 | ExampleBalancesCubeTransaction | EBCTransactionStates | WorkflowStateTypes | Additive | | | Posted |
| ✓ | 📄 | ExampleBalancesCubeTransaction | EBCTransactionStates | WorkflowStateTypes | Subtractive | Posted | | |
| ✓ | 📄 | ExampleBalancesCubeBudget | EBCBudgetsStates | WorkflowStateTypes | Additive | | | Approved |
| ✓ | 📄 | ExampleBalancesCubeBudget | EBCBudgetsStates | WorkflowStateTypes | Subtractive | Approved | | |
| + | | | | |⏮ ◀ 1 ▶ ⏭ 15 ▼ | | | | ‹COLUMNS›▽ |

+ ADD

▷ AUDIT INFORMATION

REALTIME DATA SUMMARIZATION AND AGGREGATION WITH CUBES

CROSS-REFERENCE TO RELATED APPLICATIONS

This application claims priority to U.S. Provisional Application Ser. No. 62/975,522 filed Feb. 12, 2020, which is incorporated herein by reference in its entirety for all purposes.

BACKGROUND

Detailed organizational data powers the day-to-day operations of an organization and large amounts of organizational data is created daily. However, this detailed organizational data is of little use to an organization when trying to make big-picture decisions due to the fact that it is too granular and dense. For this reason, organizational data may be aggregated and summarized into decisional data-data that can be efficiently queried, analyzed (by humans or machines), and ultimately used to drive the executive decisions of an organization.

Traditional approaches to generating decisional data from organizational data are brittle and specialized. Although they may ultimately produce data that can drive certain types of decisions, they are costly to implement, costly to load with data, and costly to modify as the organization's needs evolve. Further, they rarely provide real-time access to the data, forcing decision makers to drive success with delay-sometimes months or years behind the instance of time they are acting in.

A common traditional approach to aggregating and summarizing data involves loading the data into a custom-built data warehouse, against which queries can be run with more efficiency than if they were run against a regular database or organizational data. Traditional data warehouses provide access to decisional data, but have a number of drawbacks including being custom built for specific environments, are costly to build and maintain due to their size and complexity, require re-engineering if the data's structure or organization's inner working change, and can rarely provide up-to-date information because they are usually loaded and refreshed at a delay. Thus, there has been a long-felt need for a better means for providing summarized views of organizational data.

It is with respect to this general technical environment that aspects of the present technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the present technology generally relate to generating decisional data from organizational data. More specifically, some embodiments relate to aggregating and summarizing organizational data into cubes of decisional data. In one embodiment, a method of providing decisional data to endpoints comprises aggregating organizational data into a cube of decisional data, wherein the cube is a multidimensional dataset comprising the decisional data. The method further comprises receiving a cube query from an endpoint, wherein the cube query is related to at least a portion of the decisional data in the cube and comprises metadata related to the cube, generating cube query results, wherein the cube query results comprise a summarized portion of the decisional data in the cube, and returning the cube query results to the endpoint.

In some embodiments, the decisional data comprises one or more metrics and one or more dimensions. The summarized portion of the decisional data may comprise a summarized table of the summarized portion of the decisional data and the summarized table may be used to filter data and create subsets of the summarized portion of the decisional data. In some embodiments, the cube comprises a continuous table formed from the organizational data, wherein the continuous table tracks changes to the organizational data such that data in the continuous table is an up to date representation of the organizational data, and a transitional table formed from historical versions of the organizational data, wherein the transitional table tracks historical changes to the organizational data such that the transitional table is a representation of changes to the organizational data. The summarized portion of the decisional data may comprise data from one of the continuous table and the transitional table. In yet another embodiment, the method further comprises identifying a change to at least a portion of the organizational data and, in response to identifying the change to the at least a portion of the organizational data, updating the decisional data in the cube. In some embodiments, the summarized portion of the decisional data in the cube query results comprises a real-time view of the summarized portion of the decisional data.

In another embodiment of the present technology, a system comprising one or more computer-readable storage media and a processing system operatively coupled with the one or more computer-readable storage media comprises program instructions stored on the one or more computer-readable storage media for providing decisional data to endpoints, wherein the program instructions, when read and executed by the processing system, direct the processing system to at least aggregate organizational data into a cube of decisional data, wherein the cube is a multidimensional dataset comprising the decisional data. The program instructions further direct the processing system to receive a cube query from an endpoint, wherein the cube query is related to at least a portion of the decisional data in the cube and comprises metadata related to the cube, generate cube query results, wherein the cube query results comprise a summarized portion of the decisional data in the cube, and return the cube query results to the endpoint.

In yet another embodiment of the present technology, one or more computer-readable storage media have program instructions stored thereon for providing decisional data to endpoints, wherein the program instructions, when read and executed by a processing system, direct the processing system to aggregate organizational data into a cube of decisional data, wherein the cube is a multidimensional dataset comprising the decisional data. The program instructions further direct the processing system to receive a cube query from an endpoint, wherein the cube query is related to at least a portion of the decisional data in the cube and comprises metadata related to the cube, generate cube query results, wherein the cube query results comprise a summarized portion of the decisional data in the cube, and return the cube query results to the endpoint.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 10 illustrates cube views for agile tasks and velocity trends in accordance with an example of the present technology;

FIG. 11 is a flow chart illustrating a series of steps in accordance with an example of the present technology;

FIGS. 12A-12H illustrate exemplary views of a user interface for a no-code cube builder application in accordance with some embodiments of the present technology.

Figure 1:
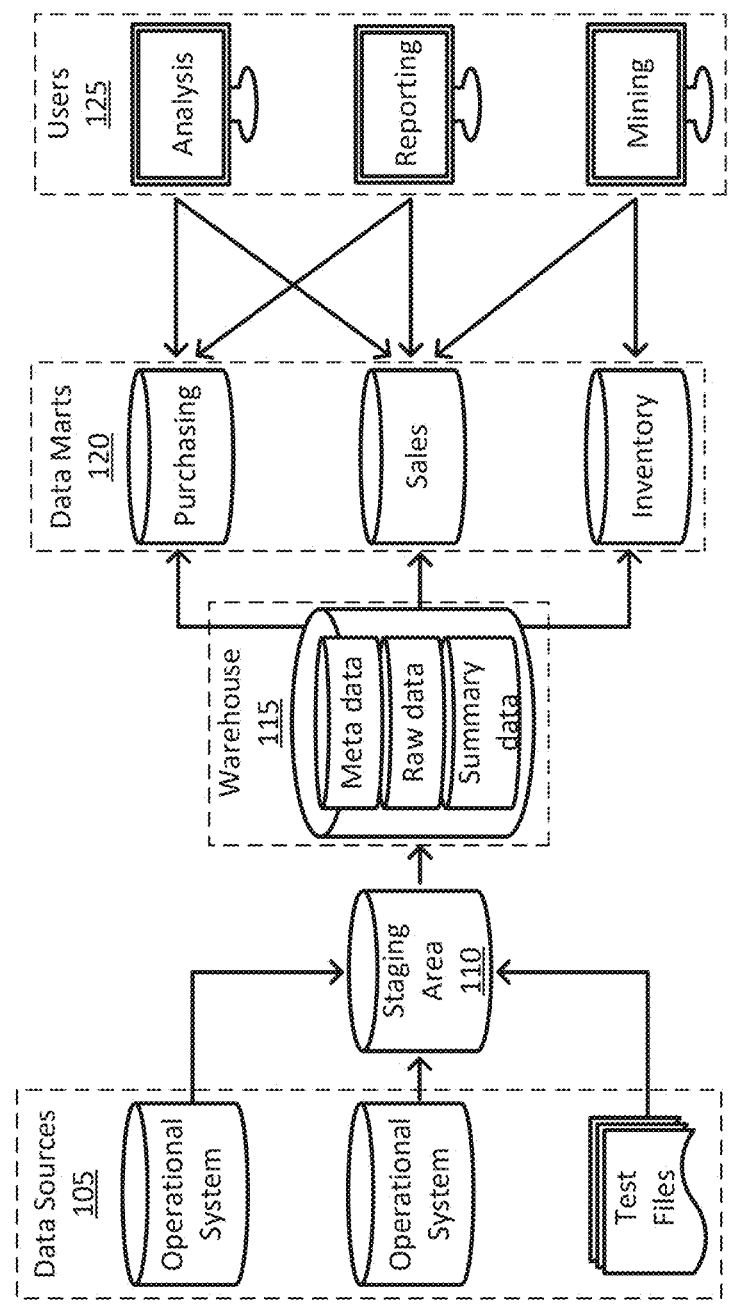
FIG. 1 illustrates a basic architecture of a data warehouse.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Some aspects of the present technology related to aggregating and summarizing data with cubes are described in the context of a no-code development platform. Applications built on a no-code development platform may be separate from the platform that delivers the technology. In this manner, when new technologies emerge, the no-code development platform may implement them instead of needing to implement them on an application-by-application basis. Separating applications from the platform leaves business practitioners free to focus on their business and spend less time keeping up with improvements to technology in their applications. Similarly, this allows business practitioners to build and change applications on their own, without the need to change or write code, requiring a fraction of the time it takes with conventional solutions.

Traditional approaches to aggregating and summarizing data involve loading data into a custom-built data warehouse, against which complex queries can be run with more efficiency than if they were run against a regular database of organizational data. This loading process is often tedious, requiring the organizational data to be cleaned and transformed, and usually necessitating relatively intimate knowledge of both the data's structure and the organization's inner workings (e.g., an understanding of nuances and caveats in the organizational data). Data marts store data relevant to any specific set of information related to reporting, analysis, and similar information. Data cubes are data marts that can be built on top of data in a data warehouse. These data marts can be queried by the organization for analysis. Some industry tools exist that can assist in this process with varying degrees of success depending on how the data warehouse was initially built, but are inefficient and difficult to handle.

FIG. 1 illustrates an example of a basic architecture of a data warehouse. Data warehouse architecture 100 includes data sources 105, staging area 110, warehouse 115, data marts 120, and users 125. Examples of data sources that may be included in data sources 105 include but are not limited to operational systems and test files. Examples of warehouse data stored in warehouse 115 may include but are not limited to metadata, raw data, and summary data. Examples of data marts that may be included in data marts 120 include but are not limited to purchasing stores, sales stores, and inventory stores. Examples of user functions that users 125 may include are analysis, reporting, mining, and similar user functions.

A data warehouse, such as warehouse 115, must be refreshed at known intervals, possibly requiring downtime to ensure data integrity, and backed up in order to mitigate catastrophes. Often, organizations use the data warehouse as a mechanism of backing up their data, possibly meaning that, in the event of a disaster, only summarized decisional data will be recoverable if the actual organizational data is not archived. As mentioned, traditional data warehouses provide access to decisional data, but have many downsides. Data warehouses are usually custom-built for specific scenarios, contexts, or environments, making them non-transferable and inflexible. Given their size, data warehouses are both costly to build and costly to maintain. Often, if the data's structure or the organization's inner workings change, large aspects of the data warehouse must be re-engineered. Furthermore, data warehouses are usually loaded and refreshed at a delay, meaning that the decisional data rarely provides up to date information to an organization's decision makers.

Thus, various embodiments of the technology described herein generally relate to a server-side approach to organizational data aggregation and summarization. More specifically, certain embodiments relate to a no-code toolset and engine that provides real-time data aggregations and summaries of organizational data into cubes of decisional data that can be queried (i.e., queryable cubes). The present technology allows for the transformation of organizational data to decisional data. Organizational data may be detailed transactional data generated by day-to-day operations of an organization, such as individual transactions charged to various accounts or the budgets of accounts maintained by an organization, as just a couple of examples. Decisional data can be efficiently queried, analyzed (by humans or machines), and ultimately used to drive executive decisions of an organization, such as aggregated summaries of accounts totals and budgets.

Reporting and analytics are important functionalities in a business-based development platform as visibility and insight are important to a business's success. Aspects of the present technology allow for informed decisions with real-time transactional data on a no-code development platform. Cubes enable users to filter, aggregate, and parse data across an enterprise over a single source of truth. Users can drill down and pivot across dimensions on any report.

Cloud platforms provide the advantage that they have access to very large or virtually unlimited amounts of processing power, memory, and storage. Toolsets may be provided over cloud platforms to build any solutions necessary for an organization. The ability to efficiently transform organizational data into decisional data, and to provide a positive user experience when interacting with said decisional data, is a necessity for many solutions that can be developed on a cloud platform. A means for efficiently aggregating and summarizing operational data into decisional data in accordance with the present disclosure can be implemented as a native toolset into a cloud platform in such a way that it may leverage existing platform architecture as well as leverage the advantages of being a cloud platform in order to provide a significant advantage over traditional data warehousing approaches. Some of the advantages of the aggregation and summarization toolset disclosed herein include fast and easy configuration with no code, aggregation and summarization of data in real-time, and a nearly seamless reaction to business evolutions, providing far more flexibility and adaptability as systems and needs of an organization change.

A cube is a multi-dimensional generalization of a spreadsheet (i.e., a multidimensional dataset) given that data can have an arbitrary number of dimensions. Datasets may have two or three dimensions represented by cubes, or more than three dimensions represented by what are often referred to as hypercubes. The cubes used to represent data are not geometric cubes in the strict mathematical sense, as all sides are not necessarily equal, but the term is nonetheless widely used. Cubes are made up of dimensions and metrics, which can be utilized in a large variety of manners. For example, an organization may have a cube that summarizes their financial data. The financial data may be summarized into actual amount and budgeted amount (i.e., the metrics) by account, product, category, fiscal period, and location (i.e., the dimensions), as an example.

Cubes, in accordance with the present disclosure may be a Nextbot™ toolset and engine, in some examples, and are designed to provide real-time aggregations and summaries of organizational data into queryable cubes of decisional data in order to empower decision makers drive continuous success. The cubes in accordance with the present disclosure may be implemented in many data-driven environments including generic or specialized cloud platforms. In some examples, the cubes are a Nextbot™ toolset and engine within the Nextworld cloud platform upon which enterprise and organizational solutions may be built. Paradigms of such a cloud platform allow it to provide toolsets that equip developers to add any conceivable solutions without the need to focus on hardware constraints.

Cubes and interactions with cubes may be defined by a few concepts specifying these interactions. Drilling down may be generally understood to represent filtering by more explicitly-not-null field values. Rolling up may be generally understood to represent filtering by more explicitly null fields. Slicing and dicing may be generally understood to represent creating a subset of data from a cube that can then be queried (e.g., drilled into or rolled up). In many use cases, certain capabilities within a cube are explicitly necessary. These requirements may include the ability to slice and dice a cube, the ability to drill down into a cube (i.e., drill down into more detailed views), the ability to roll up out of a cube (i.e., roll up to more summarized views), the ability to drill down into the detailed organizational data that a cube is built upon, and the ability to define transitional dimensions, the ability to source traditional reports with data from a query on a cube, the ability to hide and show columns in a user interface, and the ability to query cubes from logic blocks, in addition to similar interactions within cubes.

A cube may be a group of specially structured tables (e.g., PostgreSQL tables) that hold all permutations of all possible values, including those not specified, of all dimensions with the metrics aggregated for all permutations defined. In other words, it is a flattened set of data that provides all possible roll-ups and drill-downs of the specified data, in some scenarios. A cube may be made up of two types of tables of decisional data, wherein each table may be partitioned further by certain dimensions to allow for efficient queries against the database. The first type of table of decisional data is a continuous table formed from organizational data records. A continuous table keeps track of all changes to organizational data such that all rows are a current representation of defined metrics. Additive and subtractive workflow transitions may trigger updates to a continuous table. Continuous tables make it possible to query a cube and see, for example, a real-time average number of story points assigned to agile tasks in a current quarter of a current year.

The second type of table of decisional data in accordance with the present design is a transitional data table formed from historical version of organizational data records. A transitional data table keeps track of historical changes to organizational data that affect transitional dimensions. When the value of a transitional dimension changes on a record, previous metrics stored in the decisional data of the transitional table are not backed out (i.e., additive workflow transitions are processed but not subtractive workflow transitions) and only the newly affected decisional data is updated. Thus, transitional tables make it possible to query a cube and see, for example, how many agile tasks moved to a closed state in the second quarter of the year. Depending on the type of summary desired, either a continuous table or a transitional table of a cube can be queried for decisional data.

In an example, a continuous decisional data table of a cube is built of organizational data agile tasks. The organizational data input to the cube may be filtered by year and scrum team to simplify the number of permutations needing to be generated. In the present example, null values in the organizational data may be converted to a value of "{none specified}" in the cube's decisional data in order to facilitate queries looking for drilled down views. Additionally, columns that are null in the cube's decisional data may facilitate queries that look for rolled up views. Thus, querying a cube where a column is null is essentially querying for the roll up of the otherwise specified columns. Alternatively, querying where a column is not null is essentially querying for a drill down of the otherwise specified columns. Making use of queries against a cube that combine exact matches for columns, null columns, and not null columns thus provides many options for viewing decisional data from within different perspectives.

Figure 2:
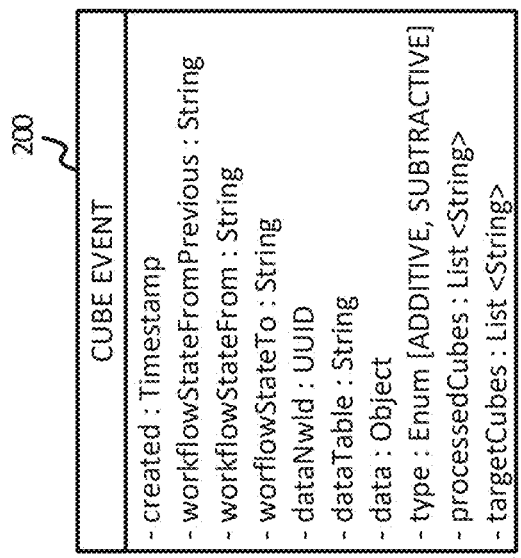
FIG. 2 illustrates a cube event data model in accordance with some embodiments of the present technology.

FIG. 2 shows cube event 200 in accordance with some embodiments of the present technology. The cube event data model includes the creation of cube events to be created and placed into a cube events table, which acts as a first-in-first-out queue whenever a potentially meaningful change is made to organizational data. Events may store a number of important pieces of information that can be used to calculate the effects of a meaningful change on the decisional data stored in the tables of a cube.

The cube event data model of the present example includes the fields: created, workflow State FromPrevious, workflow State From, workflow State To, dataNw Id, dataTable, data, type, processedCubes, and targetCubes. The workflow StateFromPrevious field of cube event 200 allows for subtractive-type cube events to be acted upon and for the appropriate previous additive-type change to be backed out. In order to ensure that cube events can be acted safely upon in parallel, a snapshot of the data of the record that triggered cube event 200. targetCubes, as shown in FIG. 2, may indicate one or more specific cubes that the cube event is targeted towards, regardless of whether it is generated by the initializer, the workflow processor, or another system module.

Figure 3:
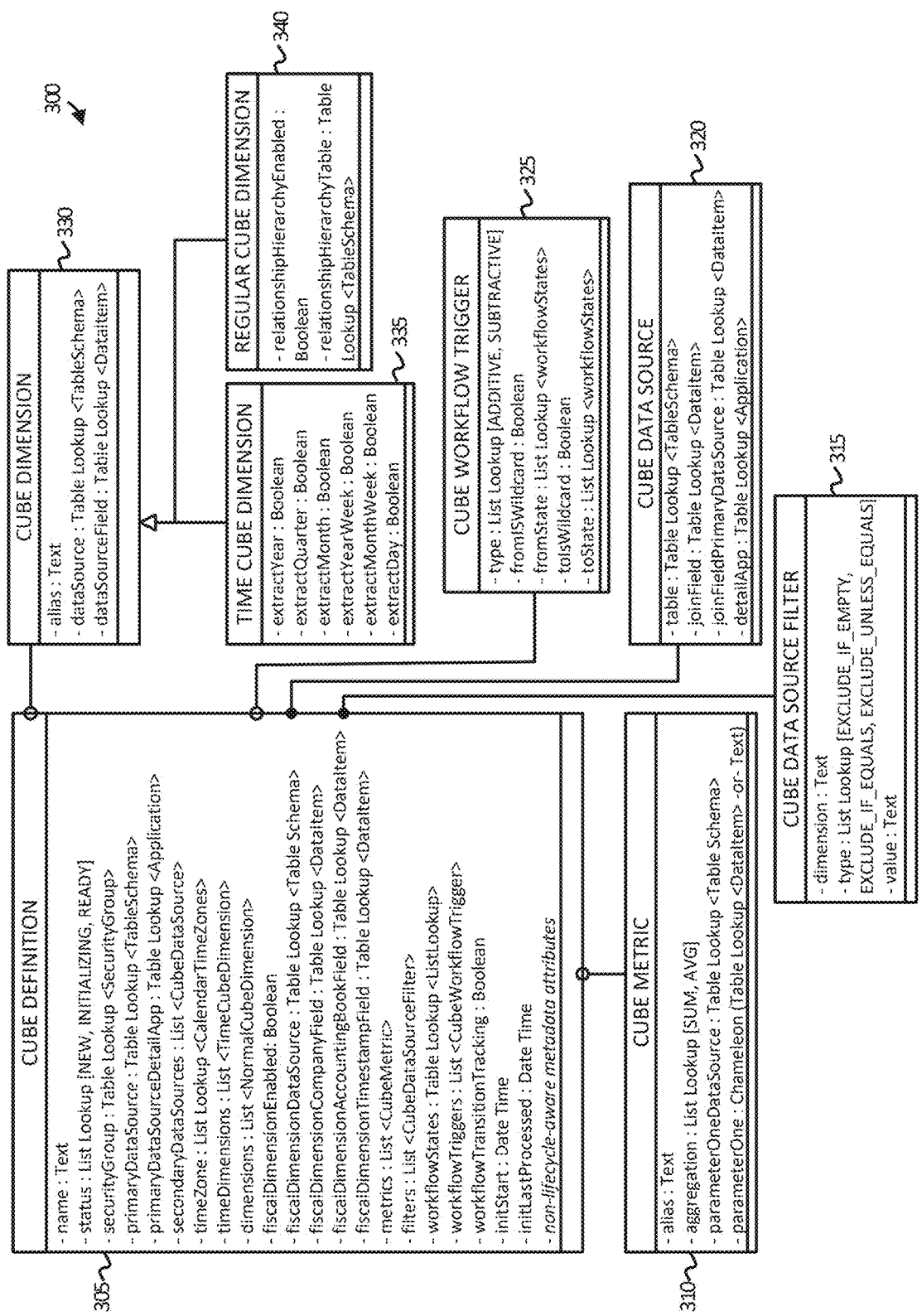
FIG. 3 illustrates a cube definition data model in accordance with some embodiments of the present technology.

FIG. 3 shows cube definition data model 300 in accordance with some embodiments of the present technology. A cube definition is the data structure that defines a cube. The cube definition may hold metadata about a cube's data sources, dimensions, metrics, filters, and similar information stored as metadata. The cube definition data structure of the present example does not make use of sub table "main" types and only makes use of sub table "sub" types, which aids in the implementation of migration support tools that may not yet be developed or integrated. Furthermore, the cube definitions of the present example are considered non-lifecycle-aware metadata uniquely keyed by their name.

Cube definition data model 300 includes cube definition block 305, cube metric block 310, cube data source filter block 315, cube data source block 320, cube workflow trigger block 325, cube dimension block 330, time cube dimension block 335, and regular cube dimension block 340. Cube definition data model 300 is described from the perspective of the cloud platform, in some implementations and is not intended to describe full implementation details, but rather to convey general intention. In accordance with the present example, it is necessary to pull in some non-nwData, such as the nwCreatedDate field of the primary data source, which is a required dimension of the present example in order to support partial re-initialization of the cube.

Figure 4:
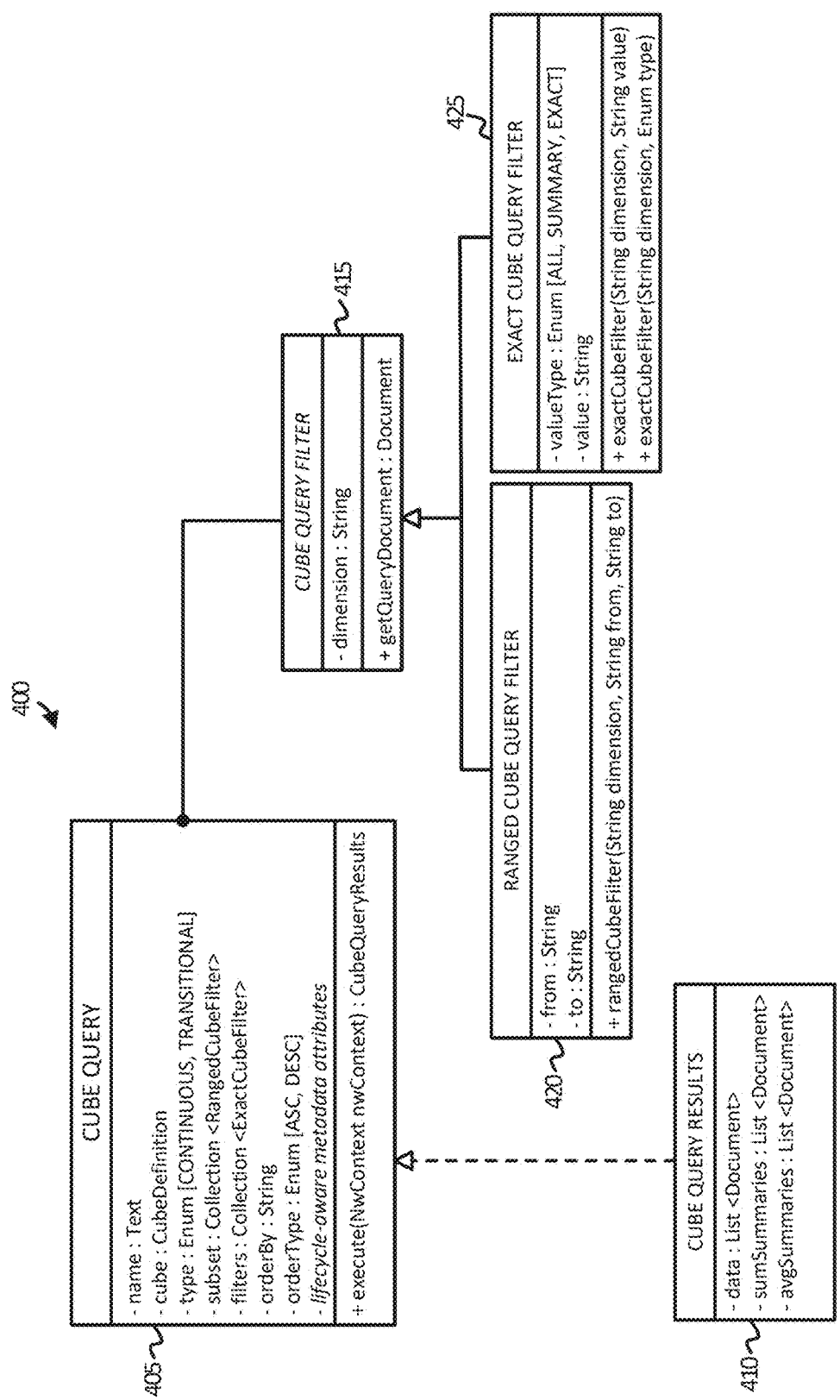
FIG. 4 illustrates a cube query data model in accordance with some embodiments of the present technology.

FIG. 4 shows cube query data model 400 in accordance with some embodiments of the present technology. A cube query is the data structure that defines a query that can be executed to retrieve decisional data from a cube. The cube query holds metadata about the way a specified cube should be sliced and diced, drilled down, sorted, and the like. A cube query may be executed via any number of components in a cloud platform in accordance with some embodiments of the present technology. These components may include, in certain examples, a cube queries application, special logic block actions, a reporting engine, and many other components. Cube query data model 400 includes cube query block 405, cube query results block 410, cube query filter block 415, ranged cube query filter block 420, and exact cube query filter block 425. Cube query data model 400 is not intended to describe full implementation details, but rather to convey general intention.

In some implementations, cubes are restricted entities within a cloud platform for purposes of security. Apart from system-level processing, cubes may be interacted with solely within the confines of a secured user context. If an accessing user does not have read permissions for a cube, either via direct designation or roles and permissions or indirectly via read permission on a cube's security group, no decisional data of a cube is returned from any cube endpoints in response.

Figure 5:
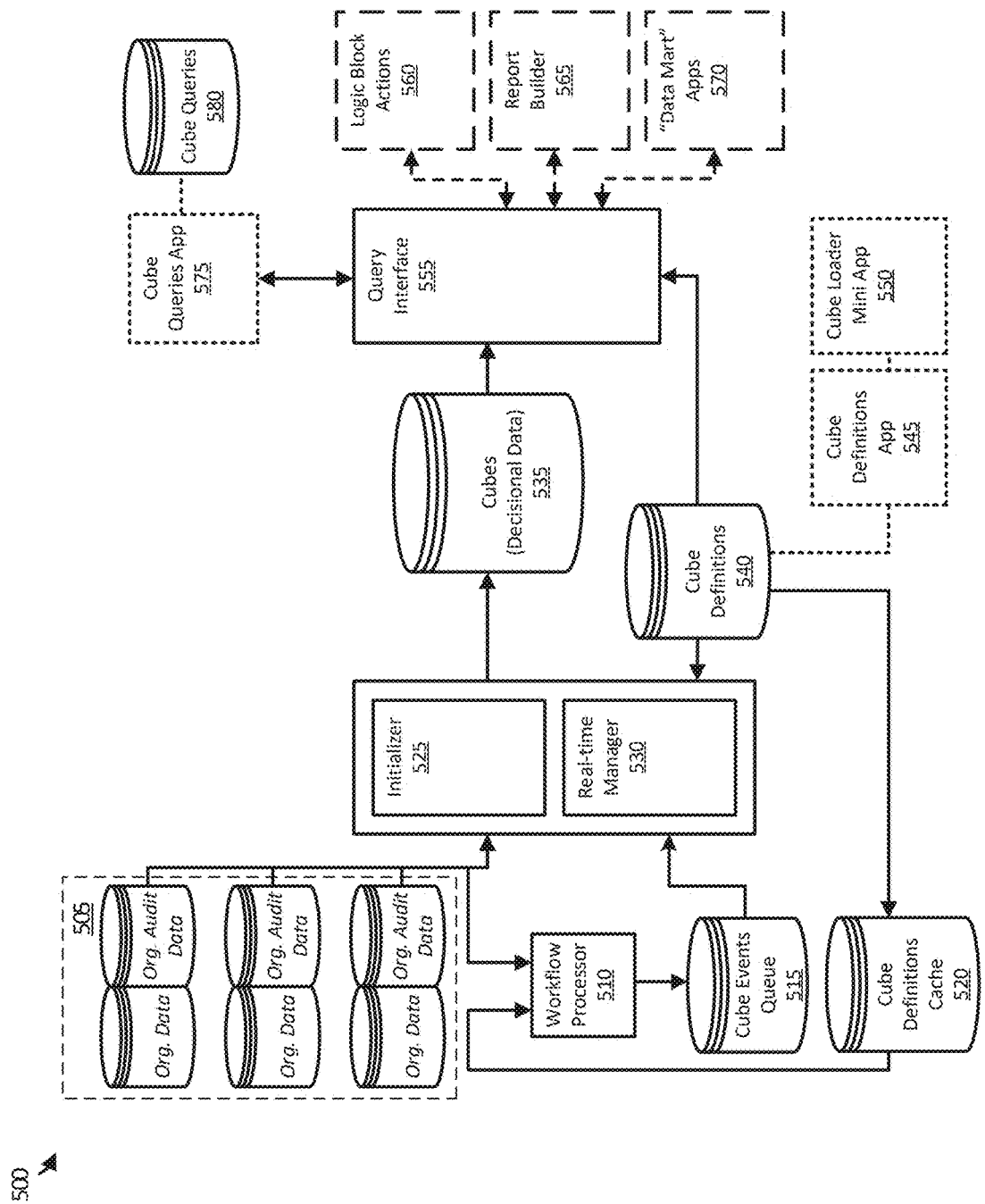
FIG. 5 illustrates an example of a cube architecture and data flow in accordance with some embodiments of the present technology.

FIG. 5 shows cubes architecture and data flow 500 in accordance with some implementations of the present technology. Cubes architecture and data flow 500 includes data stores 505, workflow processor 510, cube events queue 515, cube definitions cache 520, initializer 525, real-time manager 530, cubes 535, cube definitions 540, cube definitions app 545, cube loader mini app 550, query interface 555, logic block actions 560, report building 565, "data mart" apps 570, cube queries app 575, and cube queries data store 580. Cubes architecture and data flow 500 is not intended to describe full implementation details, but rather to convey general intention.

Figure 6:
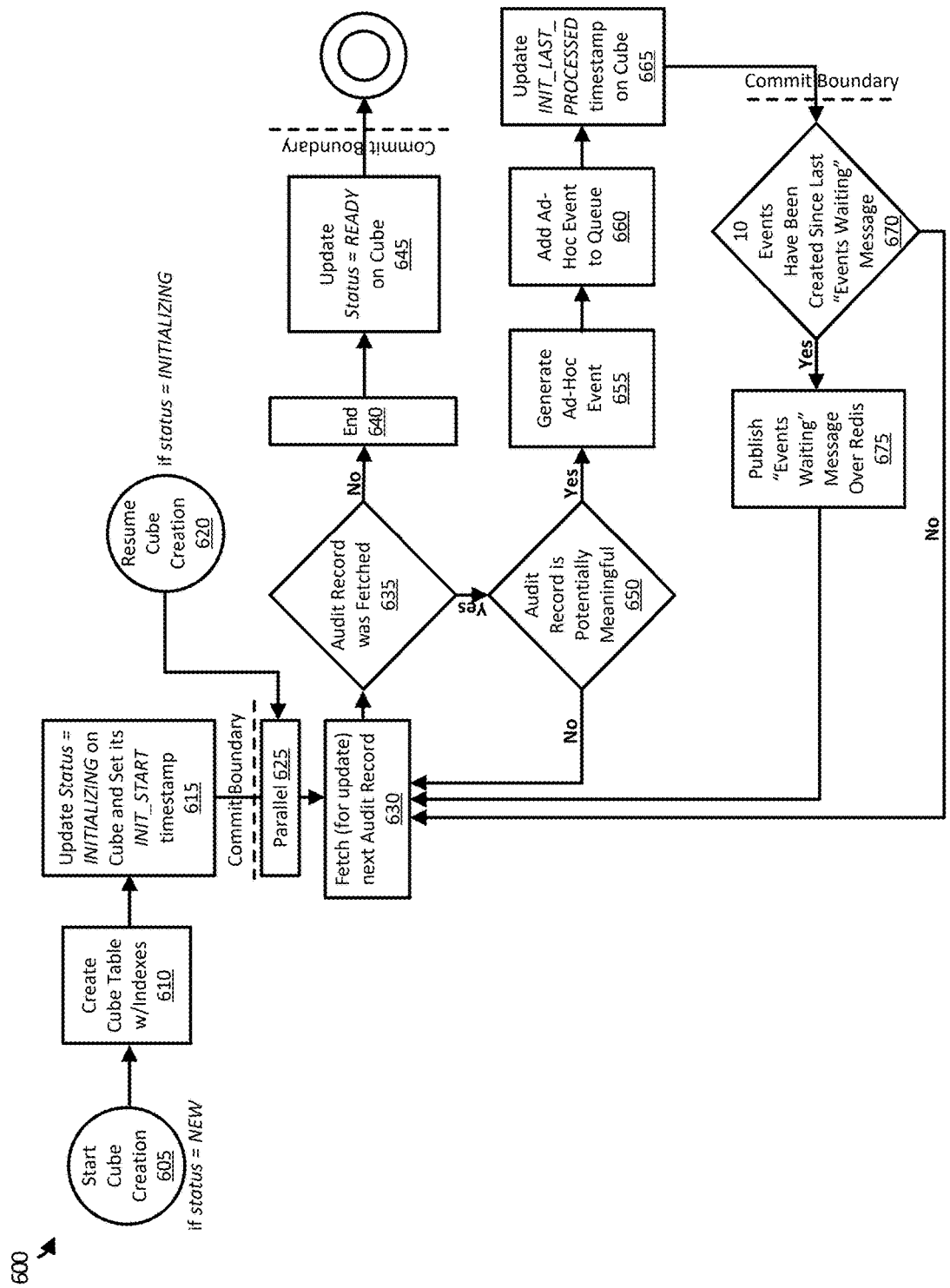
FIG. 6 illustrates an initializer logic flow in accordance with some embodiments of the present technology.

Initializer 525 of the present example is responsible for creating cube tables, continuous and transitional, associated with a cube in the cubes database (e.g., the PostgresSQL database) as well as for creating cube events for known historical version of its source organizational data in order to load it with decisional data that represents the historical organizational data. FIG. 6 shows initializer logic flow 600 for an initializer such as initializer 525 in accordance with some embodiments of the present technology. Initializer logic flow 600 begins with the start of a cube creation 605, via a cube loader mini application in some examples. In step 610 a cube table with indexes is created. A cube table, in accordance with some examples, has indexes for each dimension of the cube it holds decisional data for. These indexes may be exact-match indexes. In some scenarios, indexes may also be created for each permutation of the dimensions of the cube.

In step 615, the initializer updates the cube status to INITIALIZING and sets its initializing start timestamp, INIT_START. If the status of another cube is also INITIALIZING, the initializer resumes cube creation for that cube in step 620 and the cubes may be entered into parallel processing in step 625. In step 630, the initializer attempts to fetch the next audit record for a cube and determines if it was fetched in step 635. If an audit record was not fetched, the initializer ends the initializer process for the cube in step 640 and updates the cube's status to READY in step 645.

If an audit record was fetched in step 630, the initializer determines if the audit record is potentially meaningful in step 650. Checking if the audit record is potentially meaningful may require checking the most previous audit record in addition to the present audit record to determine, at least, any transitions that may have occurred. If the audit record is not potentially meaningful, the initializer returns to step 630 for the cube. If the audit record is potentially meaningful, the initializer generates an ad-hoc event for the cube in step 655 and adds the ad-hoc event to the queue in step 660. Once the ad-hoc event has been added to the queue, the initializer updates the INIT_LAST_PROCESSED time stamp on the cube before proceeding to step 670. In step 670, the initializer determines if ten events have been created since last "events waiting" message. Step 670 may differ in other implementations including a different number of events criteria. If ten events have not been created since the last "events waiting" message, the initializer returns to step 630. If ten events have been created since the last "events waiting" message, the initializer publishes the "events waiting" message over a publish-subscribe in step 675.

It should be noted that since cubes are built using historical audit records, in some examples, they can only be initialized with historical organization data as far back as associated audit records actually exist. Audit tables are often truncated in the development environment and occasionally in production environments. In accordance with the present implementation, a separate mechanism of saving the historical organizational data in audit records is not included herein when truncation occurs. In some implementations, a cube loader application may communicate to the user how far back historical data from audit records is available, as it will determine how accurate the historical load or re-load is.

With respect to failure management within the initializer, the various starting points and commit boundaries in initializer logic flow 600 serve to illustrate failure management checkpoints. Whenever the initializer processes an audit record, the timestamp of that audit record is recorded. If a failure occurs mid-initialization, it may be picked up back up by processing audit records created after said timestamp but prior to the start of initialization.

Referring back to FIG. 5, initializer 525 processes audit records that have been created prior to its start into events. This processing of audit records is a process that can be parallelized because processing of an event, even an ad-hoc event created from an audit record, is an atomic, order-agnostic operation. When a cube is initialized, all historical records are processed, in some examples, as it is likely that the cube being initialized should include dimensions or workflow transitions that other cubes previously did not need to include.

Cube events queue 515, or the queue, is a distributed first-in-first-out queue. Cube events queue 515 is where cube events are pushed whenever organizational data is inserted, updated, or deleted and it is determined by workflow processor 510 that a meaningful change may have occurred. These cube events hold a reference to the table of organizational data in question (e.g., by name), the new identifier of the record that caused the cube event, a snapshot of contents of the record at event causation, and the workflow transition that caused the event, in accordance with the present implementation. Processing loops running on cube-type servers may occasionally be awoken via a publish-subscribe (pub-sub) system to check cube events queue 515 for work. If work is present, the processing loops may automatically retrieve the next event from cube events queue 515 in such a way that only a single process can retrieve a given event.

Cube definitions cache 520 is an in-memory cache. Cube definitions cache 520 may be refreshed whenever a cube definition is inserted, modified, or deleted. The cache provides quick access to the metadata that describes a cube and provides a simple application programming interface (API) for determining if a record is potentially meaningful, as described further with respect to workflow processor 510.

Real-time manager 530 is responsible for detecting and processing changes (i.e., inserts, updates, deletes) to organizational data that have an effect on the decisional data stored inside of any number of defined cubes. The real-time manager performs these detections and processing actions in real-time or near-real-time as organizational data is modified. However, real-time manager may not perform these actions synchronously with user-initiated transactions. Depending on how many cubes rely on the organizational data in the transaction and how many dimensions those cubes are made of, updating the decisional data can take a meaningful amount of time for real-time manager to complete. Real-time manager 530 runs on servers marked as cube-type servers, in the present example.

Workflow processor 510 watches for changes to records in order to remove the need for heavy lifting from the synchronous scope of user-initiated transactions. As such, primary data sources of organizational data always have workflow processor 510 enabled in the present example. When workflow processor 510 identifies a new change to a record (e.g., insert or update), it will determine if the new change is meaningful to any generated cubes by querying the in-memory cube definitions cache 520. If workflow processor 510 determines that the change is meaningful to at least one cube, an event is placed into the queue in cube events queue 515 and an "events waiting" message is published so as to wake up any sleeping processing loops. The workflow processor design uses a single condition to indicate that a change to a record is meaningful: a workflow transition, subtractive or additive, that is defined as a trigger for a cube has occurred. Record deletions, which are meaningful changes, are an exception to offloading the above-identified heavy lifting and workflow processor 510 does not necessarily perform the processes described for record deletions. Thus, events are created for such events at the synchronous scope of user-initiated transactions.

Figure 7A:
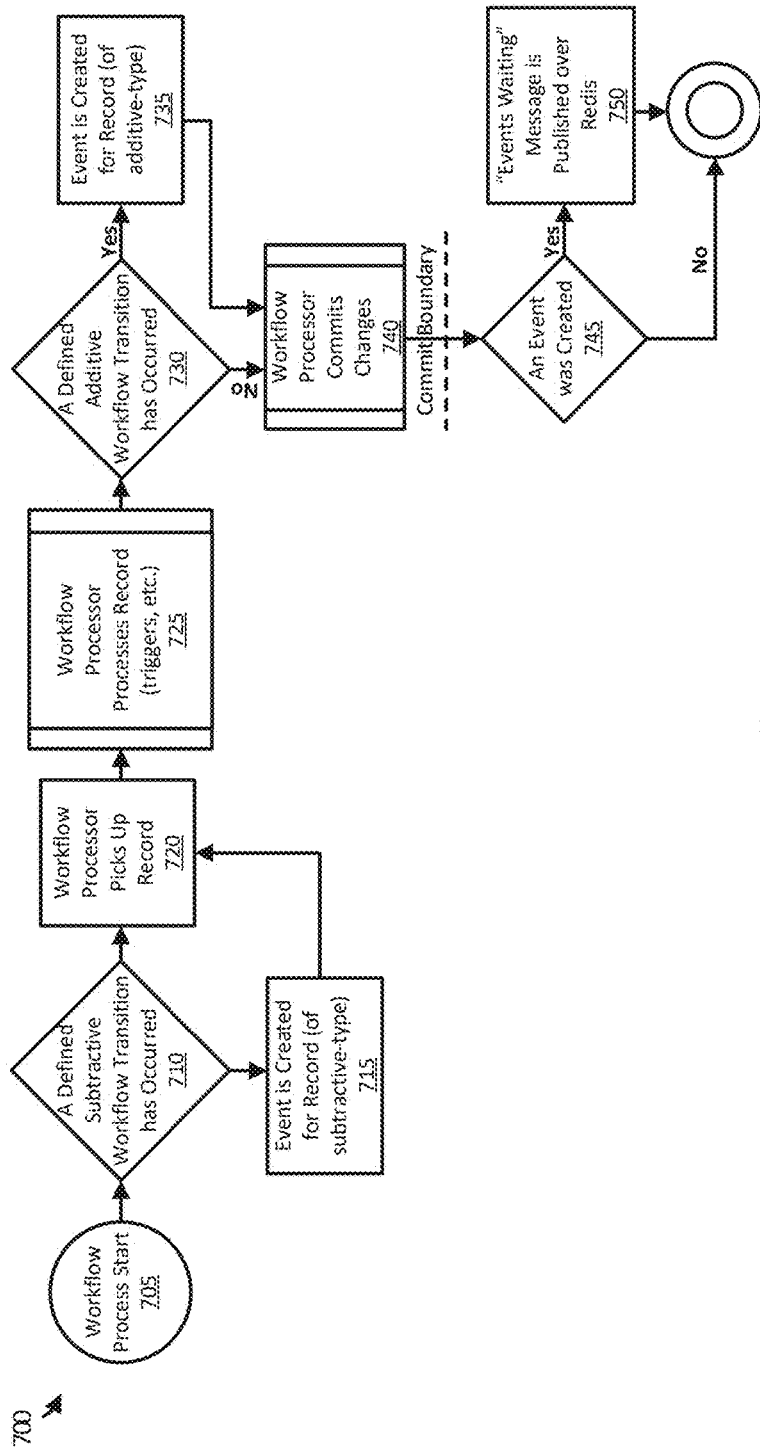
FIGS. 7A and 7B illustrate organizational data processing flows in accordance with some embodiments of the present technology.
Figure 7B:
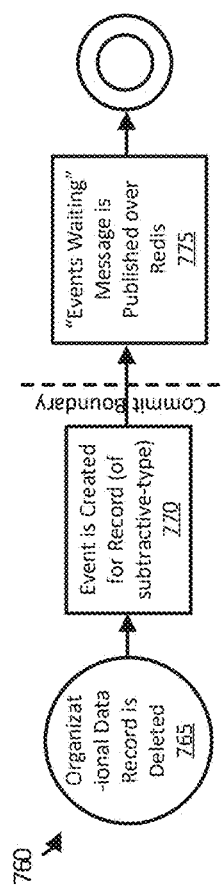

FIG. 7A shows organizational data processing flow 700 for event creation. FIG. 7B illustrates an example flow in response to a record being deleted. In step 705 of organizational data processing flow 700, workflow processor 510 kicks in and event creation begins due to the organizational data record being created or modified. In step 710, the workflow processor determines if a defined subtractive workflow transition has occurred. If a defined subtractive workflow transition has not occurred, the workflow processor creates an event of subtractive type for record in step 715 and then picks up the record in step 720. If a defined subtractive workflow transition has occurred, the workflow processor picks up the record in step 720. Upon picking up the record, the workflow processor processes the record in step 725 and then, in step 730, determines if a defined additive workflow transition has occurred. If a defined additive workflow transition has occurred, the workflow processor creates an additive type event for record and then commits changes in step 740. If a defined additive workflow transition has not occurred, the workflow processor proceeds directly to step 740 and commits changes. In step 745, the workflow processor determines if an event was created and if it was, publishes an "events waiting" message over the pub-sub system.

FIG. 7B shows event creation flow 760 in response to an organizational data record being deleted in accordance with some embodiments of the present technology. Event creation flow 760 begins at step 765 when an organizational data record is deleted. In step 770, the workflow processor creates an event for record of the subtractive type. In step 775, the workflow system publishes an "events waiting" message over the pub-sub system.

Figure 8:
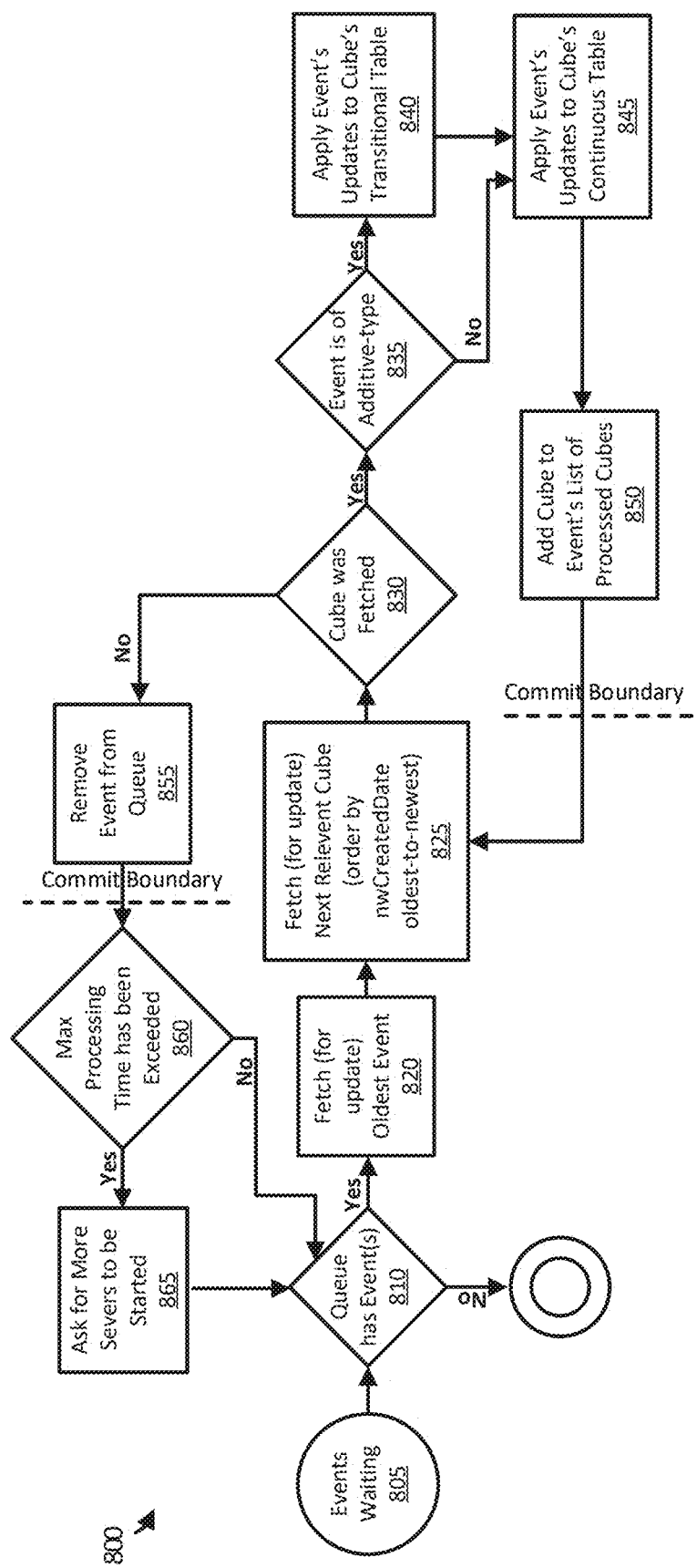
FIG. 8 illustrates a real-time manager loop logic flow in accordance with some embodiments of the present technology.

FIG. 8 shows real-time manager loop logic flow 800 in accordance with some embodiments of the present technology. Real-time manager loop logic flow 800 is a processing loop to subscribe to a pub-sub system, which may be a Redis pub-sub system in some embodiments. When an "events waiting" message is received in step 805, such as from workflow processor 510 in accordance with FIGS. 7A and 7B, the loop, implemented within real-time manager 530 in accordance with some implementations, wakes up and begins processing events from the queue. In step 810, the real-time manager determines if the queue has events. If the queue does have events, the real-time manager fetches the oldest event for update in step 820. The real-time manager then fetches the next relevant cube for update in step 825, wherein the next relevant cubes are ordered by the oldest to newest created dates.

In step 830, the real-time manager determines if a cube was fetched and if it was, proceeds to step 835. If a cube was not fetched, the loop continues to step 855 in which the event is removed from the queue. Once the event is removed from the queue, the real-time manager determines if the maximum processing time has been exceeded in step 860. If the maximum processing time has been exceeded, the real-time manager asks for more servers to be started in step 865 before returning to step 810. If the maximum processing time has not been exceeded the real-time processor loops directly back to step 810.

If the real-time manager determines that a cube was fetched in step 830, the loop proceeds to step 835 in which it determines if the event is of an additive type. If it is not of an additive type, the real-time manager applies the event's updates to the cube's continuous table in step 845. If the event is of an additive type, the real-time manager applies the event's updates to the cube's transitional table in step 840 and then proceeds to applying the event's updates to the cube's continuous table in step 845. In step 850, the real-time manager adds the cube to the event's list of processed cubes and then loops back to step 825 and fetches the next relevant cube. The commit boundaries shown in FIG. 6, FIG. 7A, FIG. 7B, and FIG. 8 serve as failure management safeguards in that they ensure that if a failure occurs, whether recoverable or critical, the changes will be rolled back, and a subsequent run of the loop may try again.

In the case of a critical failure to the system architecture, such as a critical failure of the cloud network system, the present technology allows for the data integrity of cubes to be preserved. To ensure that the data integrity of the cubes is preserved, no events are lost and remain unprocessed by the loop for an extended period of time. The cube-type servers may run a thread that wakes up at set time intervals, checks the cube event queue for events, and publishes an "events waiting" message if any are found such that any sleeping loops wake up in response to the message. The time interval (e.g., fifteen minutes) is long enough that any hits performed against the database have a trivial effect on performance but is short enough to ensure recovery in a timely manner.

The system described herein calls for a query interface to be provided as an API for executing queries on actual cube query objects in an efficient manner. Executions of cube queries may return a cube query results object that provides appropriate getters and can be serialized with ease.

In some implementations, a cube definitions application provides a user interface through which cubes can be defined, wherein the cube definitions application provides a means to fully define a cube definition via tables, planner definitions, and the like. Some implementations may further include a cube loader mini application to be accessible via a row action (i.e., application link) in the cube definitions application. The cube loader application is built on top of the same cube definitions table as the cube definitions application but provides the ability to actually trigger a run of the initializer.

Figure 9:
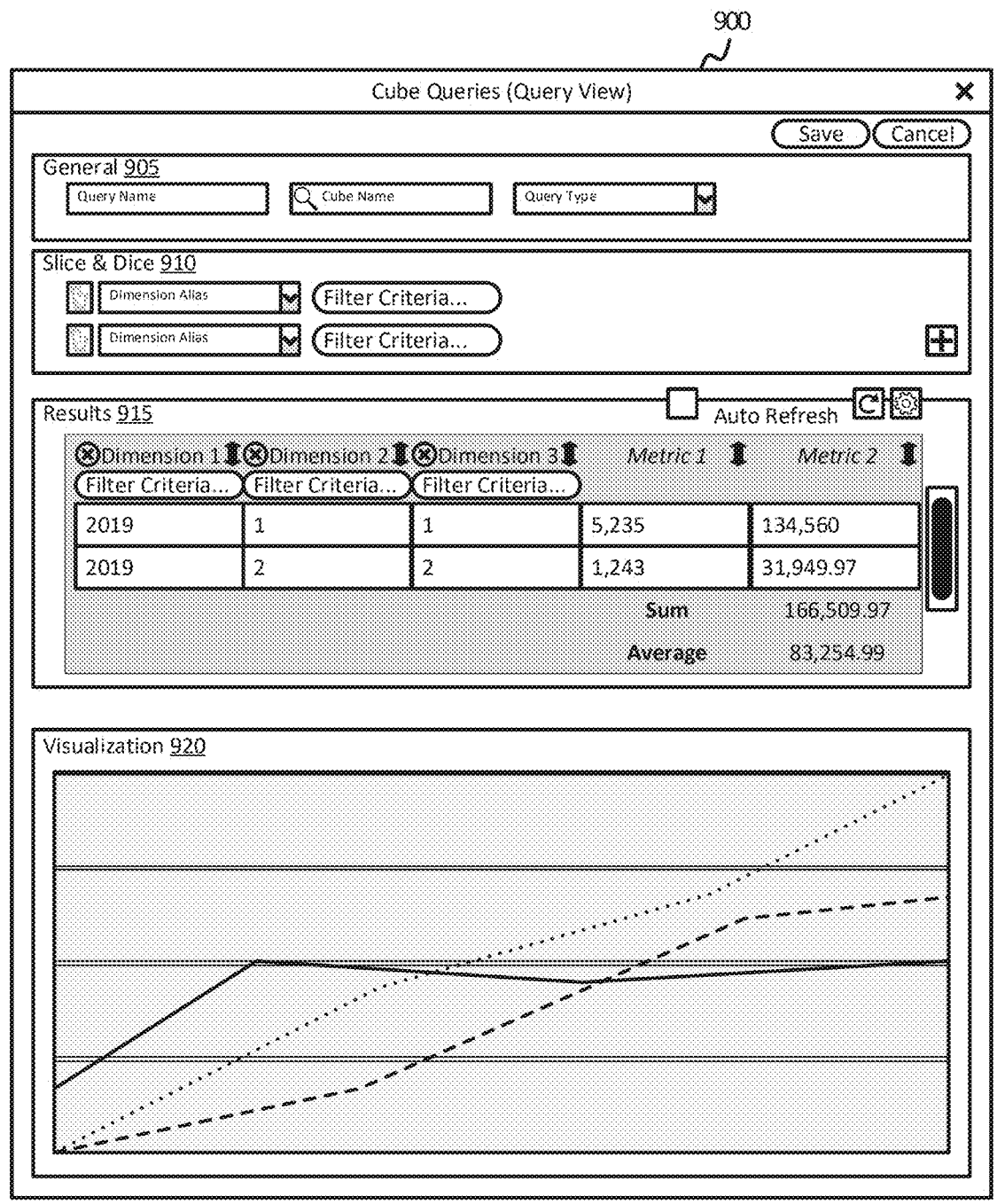
FIG. 9 illustrates an example of a cube queries application in accordance with some embodiments of the present technology.

FIG. 9 illustrates an exemplary mockup of a cube queries application and table. The cube queries application provides a user interface, such as query view 900 for example, through which cubes can be interacted with. Instead of needing to generate static reports on the decisional data stored inside of a cube in order to view it, the cube queries application provides a real-time view of the data that can be sliced, diced, drilled down, or rolled up. Query view 900 includes general query module 905, slice and dice module 910, results module 915, and visualization module 920. General query module 905 includes inputs for query name, cube name, and query type, and provides general information about the query. A user should only be able to pick cubes that they have access to via general query module 905 in accordance with the present example. Queries built for cubes that the user does not have access to will not load any decisional data and should not display. Queries may return either decisional data from a cube's continuous table or from a cube's transitional table.

Slice and dice module 910 provides slice and dice criteria and allows for a selection or input of ranges of filter criteria. Slice and dice criteria causes the creation of the queryable subset of the cube. Since the dimensions and filter criteria can be known upfront via a cube's endpoints, there is no need to provide an arbitrary text field in slice and dice module 910 for filter criteria in the present example. However, in other implementations, text fields or other filter criteria may be used. Results module 915 provides the results according to the criteria provided in general query module 905 and slice and dice module 910.

Results module 915 includes capabilities for showing and hiding columns for both dimensions and metrics, auto-refreshing the view of decisional data in order to provide a real-time view of changing data, changing the displayed sorted order of columns, rolling up columns, drilling down into data, and similar functionalities for interacting with displayed data. Rolling up a column essentially changes a column's filter criteria to all. Results module 915 also includes the ability to specify exact match filter criteria in order to drill down into decisional data. Acting on an empty cell may serve to set all other columns to filter by the values of the acted-on column to filter by all. Acting on a populated cell may maintain the current filter criteria of all other columns but sets the filter criteria of the acted-on column to the value of the acted-on cell. Eventually, once all columns are filtered (i.e., drilled down) to an exact match, interacting with a column may link the user over to a detail application specified in the cube's definition for the dimension. This application linking functionality allows the user to drill all of the way down into a specialized detail view of the organizational data that makes up the decisional data they have been interacting with up until the point of linking.

Visualization module 920 may be included in some implementations and is built directly into the cube queries application and can provide various visualization functionalities including charts, graphs, illustrations, and other mechanisms for providing real-time, dynamic visualizations.

A cube queries table, interfaced with via the cube queries application, holds records defining the slice and dice criteria, drill down criteria, sort order, column hide/display configuration, and the like, of a cube query. This cube queries table allows for specific, commonly desired views of the decisional data inside of a cube to be quickly accessed upon demand. The functionalities also provide and abstraction layer between low-level cube queries and other areas of the cloud network that may want or need to interact with the decisional data stored inside of a cube. In this way, instead of building up a low-level query, a user can simply reference a cube query that has been predefined within the application. On top of having query view 900 shown in FIG. 9, a regular list view may also be provided as part of the cube queries application.

Endpoints (outgoing communications) utilized in accordance with some examples the present technology are discussed herein. Cube query endpoints provide the ability to specify a cube to query, the ability to specify a slice and dice of the cube, the ability to specify a drill down criteria of the cube, return all matched rows, return simple aggregations (i.e., sum, average, etc.) of the metrics from all matched rows, and only successfully return results if the user making the request has read permissions to the specified cube's security group. Cube dimension values endpoints provide the ability to specify a cube to query, specify dimensions for which all possible values should be returned, return all current possible values of the specified dimensions of the specified cube, and only successfully return results if the user making the request has read permissions to the specified cube's security group.

The specific endpoints discussed here are not intended to limit the technology and are provided solely for purposes of example. An example of an endpoint used in accordance with some embodiments of the technology discussed herein is /v1/cubes/{cube name}/details. This endpoint provides a mechanism for retrieving details (i.e., dimensions, metrics, etc.) about a cube reference by cube_name. User interface components such as the cube queries application may access this endpoint and use its results to create a better user experience. Another example endpoint,/v1/cubes/{cube_name}/query, provides a mechanism to arbitrarily query a cube. The payload it expects is the same as a cube query record as defined in the cube queries data model. The present design calls for this endpoint to return results as a data structure as that of a serialized cube query results object in response to a valid request. The data attribute of the returned object is an array, in some embodiments, representing each returned row of the cube's dimensional data. A sumSummaries attribute may be returned, which is an object with one child attribute per metric of the cube valued with the sum of the metric's column for the returned rows. An avgSummaries attribute may be returned which is an object with one child attribute per metric of the cube valued with the average of the metric's column for the returned rows.

Another example endpoint,/v1/cubes/query/{cube_query_name}, provides the same cube query mechanism and response payload structure as the/v1/cubes/{cube_name}/query endpoint with a key difference being that, instead of specifying an arbitrary cube query in the request's payload, the name of an existing cube query to execute must be provided. In yet another example, the endpoint/v1/cubes/recordStatus provides a mechanism for retrieving the current status of a particular record, meaning that it allows for a consumer to determine whether or not there are currently events pending for the given record, thus indicating that cubes relying on the record's table are not yet fully up to date. The system in response can accept the request payload and return results as a response payload to a valid request.

Several logic block actions may be implemented in accordance with the cubes for data aggregation and summarization discussed herein. In order to support diverse use cases and future needs of cubes, the design herein calls for a query cube logic block action that application developers can make use of to programmatically query dimensional data. As input, the cube query logic block allows for the specification of a cube query. This action may take on a similar footprint as a fetch records action in that it may provide both a data found and a no data block. The data found block may allow application developers to write code that will be called for each row of decisional data returned by the query. In addition to exposing each metric and dimension of each row of decisional data, the document source name used for the action may expose each of the sumSummaries and avgSummaries that the returned query payload provides.

In order to provide a feedback loop on the status of records of organizational data that need to be accounted for in the decisional data of cubes, a new check record's cube status logic block action may be implemented that allows application developers to programmatically determine whether or not a record's latest changes have been accounted for. The logic block action may take a document source name as input and output the status of pending events.

An example use case is shown in FIG. 10 in accordance with some embodiments of the cube queries application. FIG. 10 shows a use case for how a user may interact with the cube queries application and query view 900. In the present example, a user wishes to interact with agile task velocity and trends and must be able to obtain summaries of weekly agile task data. Thus, a cube is generated that is sourced with data from the agile tasks table. The user of the present example requires the ability to slice and dice, drill down, and roll up the summary data for dimensions including year, week of the year, type, project, scrum team, status (from), and status (to). The primary metric that the user wants to see is count. The user may define a subset of the cube wherein the cube is sliced and diced into a specific year, a set of weeks, a type, a project, and a status. In this example the user slices and dices the cube into year 2019, weeks 2 through 4, bug II story type, project NW1, and status (to) init. The initial view presented in accordance with the defined subset is shown in table 1005 in which the most generalized view of the cube is presented.

Drilling into the highlighted cell, cell 1006, refines the query to table 1010. Drilling into the highlighted cell of table 1010, cell 1011, further refines the query to table 1015. Acting on the highlighted cell in table 1015, cell 1016, refines the query to table 1020. Since there are no more dimensions in which to drill into in table 1020, acting on any cell of the remaining rows of table 1020 links the user over to the agile tasks application with the exact filter criteria that the row specifies. Acting on a data cell (i.e., not a header) presents the user with the detailed organizational data that the agile task trends cube is built on top of. However, if the user instead acts on a header cell, such as cell 1021, the user is rolled back to a more summarized view shown as table 1025. Table 1025 illustrates the query in response to acting on cell 1021.

In an alternative use case, cubes as described herein are implemented for inventory valuation reports in a case requiring complex metrics (e.g., a product or difference where the inputs are other metrics on the line, such as total value=quantity on hand*cost), data source filtering (e.g., to exclude organizational data who's cost dimension is 0 from being aggregated into the cube), and the ability to source traditional reports with data from a query on a cube. A cube in the present example provides aggregated and summarized data in a way that can be efficiently queried. Aggregations do not need to happen on-the-fly in the present example as a result of complex queries, but instead are cached and instantly accessible by single selection queries. The data may then be queried and viewed either using generic cube query tools provided by the cloud platform or pulled in as data to a traditional report.

In another exemplary use case requiring the ability to hide and show columns in the user interface, cubes as described herein are implemented to facilitate item ledger summary reports. Similar to the previous example, a cube in the present example provides aggregated and summarized data in a way that can be efficiently queried. Aggregations do not need to happen on-the-fly in the present example as a result of complex queries, but instead should be cached and instantly accessible by single selection queries. The data may then be queried and viewed either using generic cube query tools provided by the cloud platform or pulled in as input data to a traditional report.

In yet another example use case, cubes in accordance with the present disclosure are used for inventory demand forecasts in which the ability to query cubes from logic blocks is required. In this example, a cube provides aggregated and summarized data in a way that can be efficiently queried. Aggregations do not need to happen on-the-fly in the present example as a result of complex queries, but instead are cached and instantly accessible by single selection queries. The data is then able to be queried by logic blocks in order to support complex applications.

FIG. 11 illustrates process 1100 for providing decisional data to endpoints in accordance with some embodiments of the present technology. In step 1105, a system in accordance with the discussion herein aggregates organizational data into a cube of decisional data. The cube of decisional data in accordance with the present embodiment is a multidimensional dataset comprising the decisional data. The decisional data comprises data from the organizational data but is stored in a format such that it is easily queryable, is up to date, and can be provided in real-time. In step 1110, the system receives a cube query from the endpoint, wherein the cube query is related to at least a portion of the decisional data in the cube and comprises metadata related to the cube. In some embodiments, the cube query may be initiated in a cube queries application in accordance with certain implementations discussed herein.

In step 1115, the system generates cube query results. The cube query results comprise a summarized portion of the decisional data in the cube. An example of a summarized portion of decisional data includes table 1005 from FIG. 10. After generating the cube query results, the system returns the cube query results to the endpoint in step 1120. The endpoint, in some examples, received the cube query results in the format of a summarized table, wherein the summarized table can be interacted with similar to the example illustrated and discussed in reference to FIG. 10.

Figure 12B:
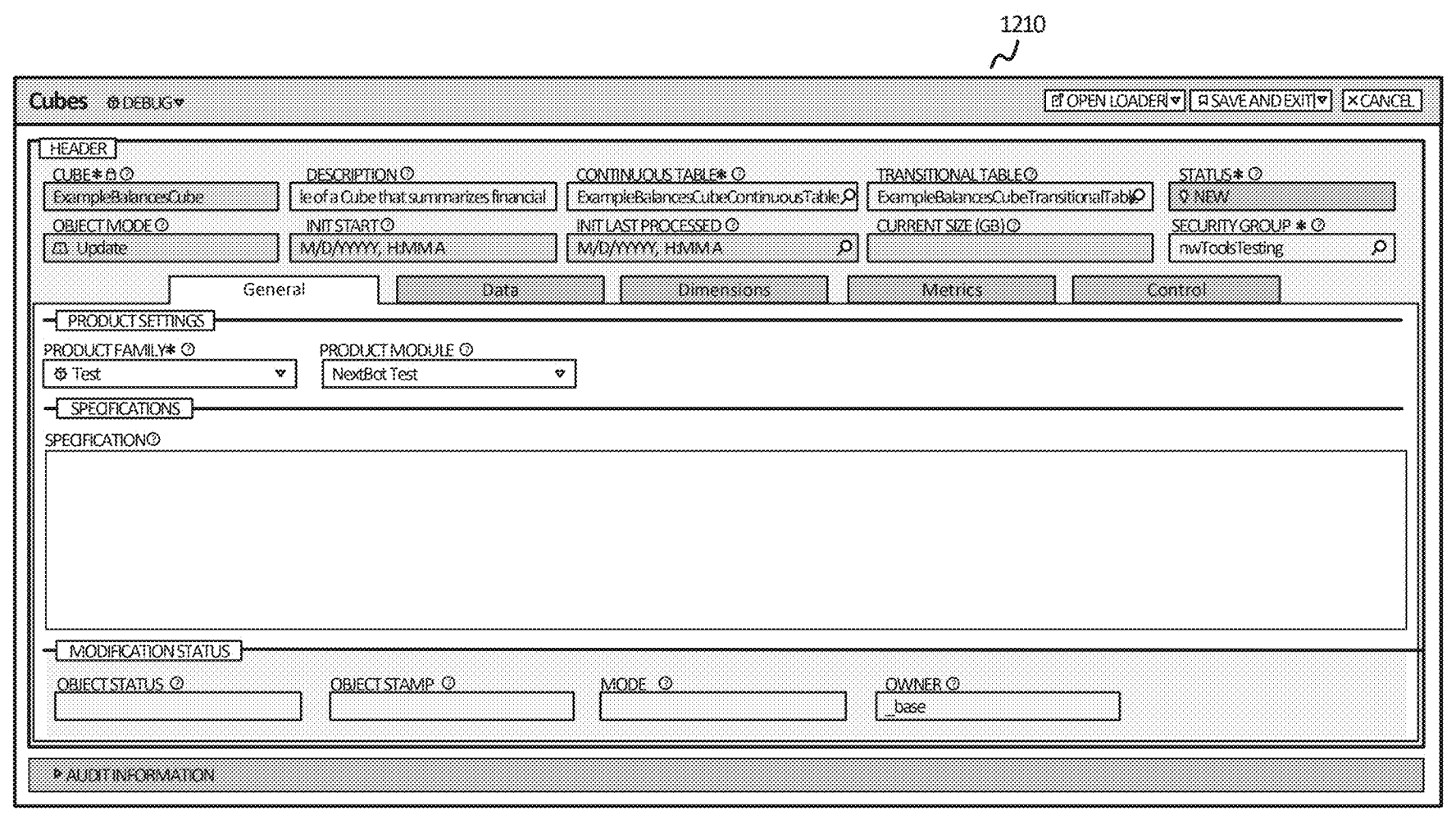
Figure 12C:
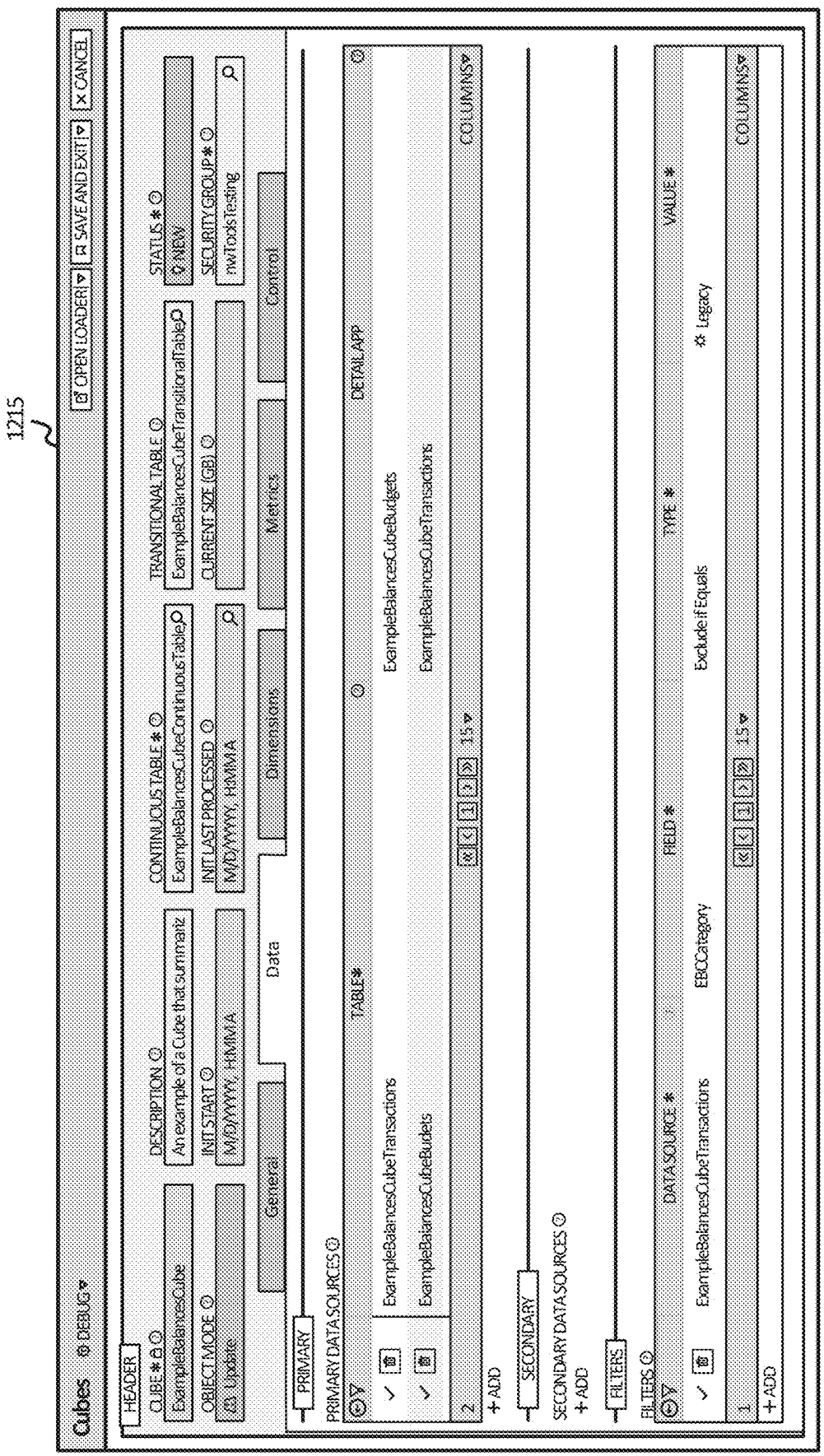

FIGS. 12A-12H show exemplary views of a user interface for a no-code cube builder application in accordance with some embodiments of the present technology. FIG. 12A shows view 1205 of a user interface including a list view of a no-code cube builder application in accordance with some embodiments of the present technology. View 1205 includes a list of cubes including an ExampleAgileTasks cube, an ExampleAgileTasksBase cube, and an ExampleBalancesCube cube along with their statuses, families, descriptions, security group, and owner. FIG. 12B shows view 1210 displaying a general page of a user interface of the no-code cube builder application. In the header of view 1210 for cube ExampleBalancesCube, the output tables (i.e., the continuous table and the transactional table) of the cube are specified, as well as some detailed information of the cube itself, which is populated by the cube engine. FIG. 12C includes view 1215 of the user interface of the no-code cube builder application. View 1215 shows a data page where data sources are pointed to and where data cleaning that should be performed on organizational data during its translation into the cube's decisional data is performed.

Figure 12D:
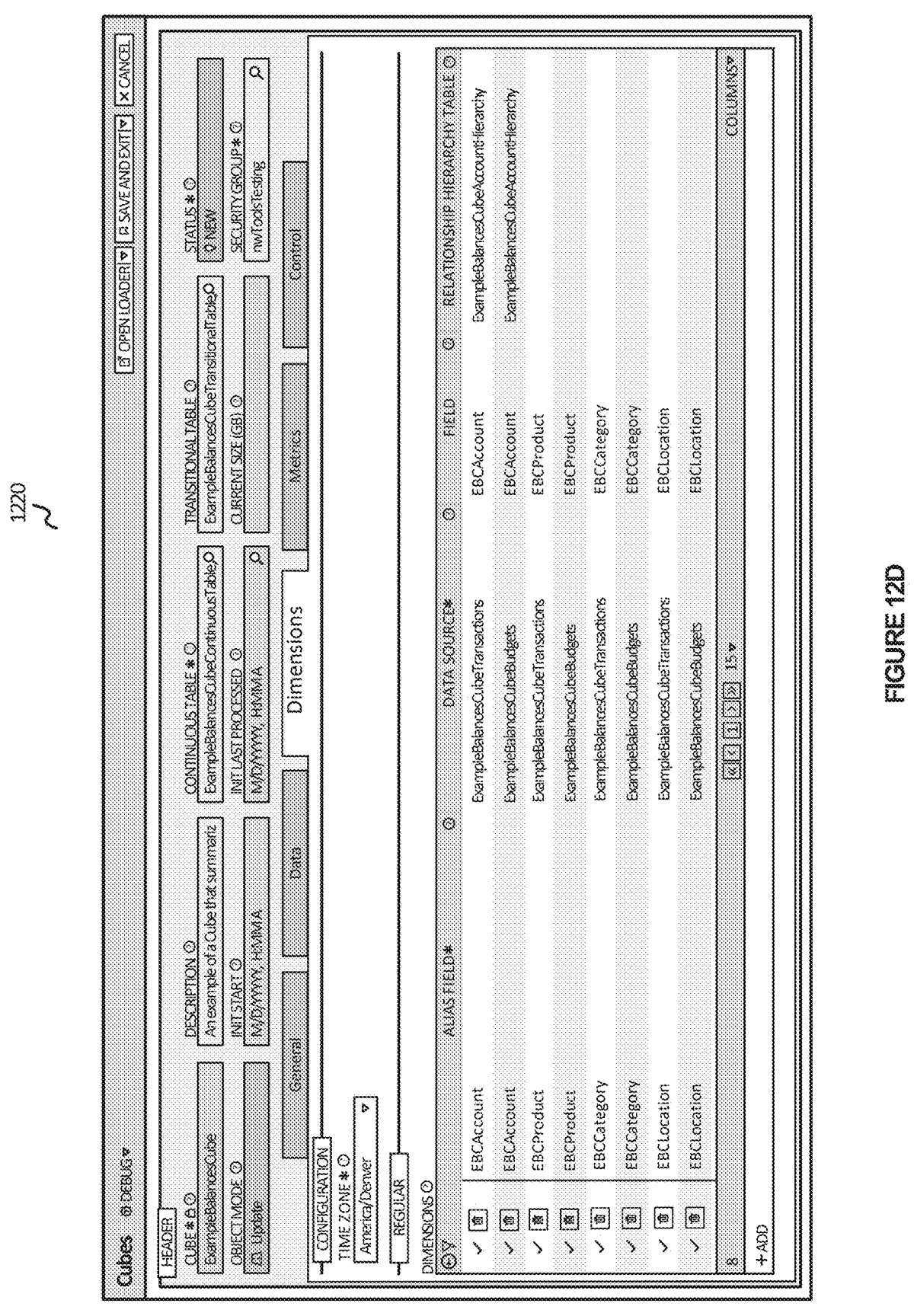
Figure 12E:
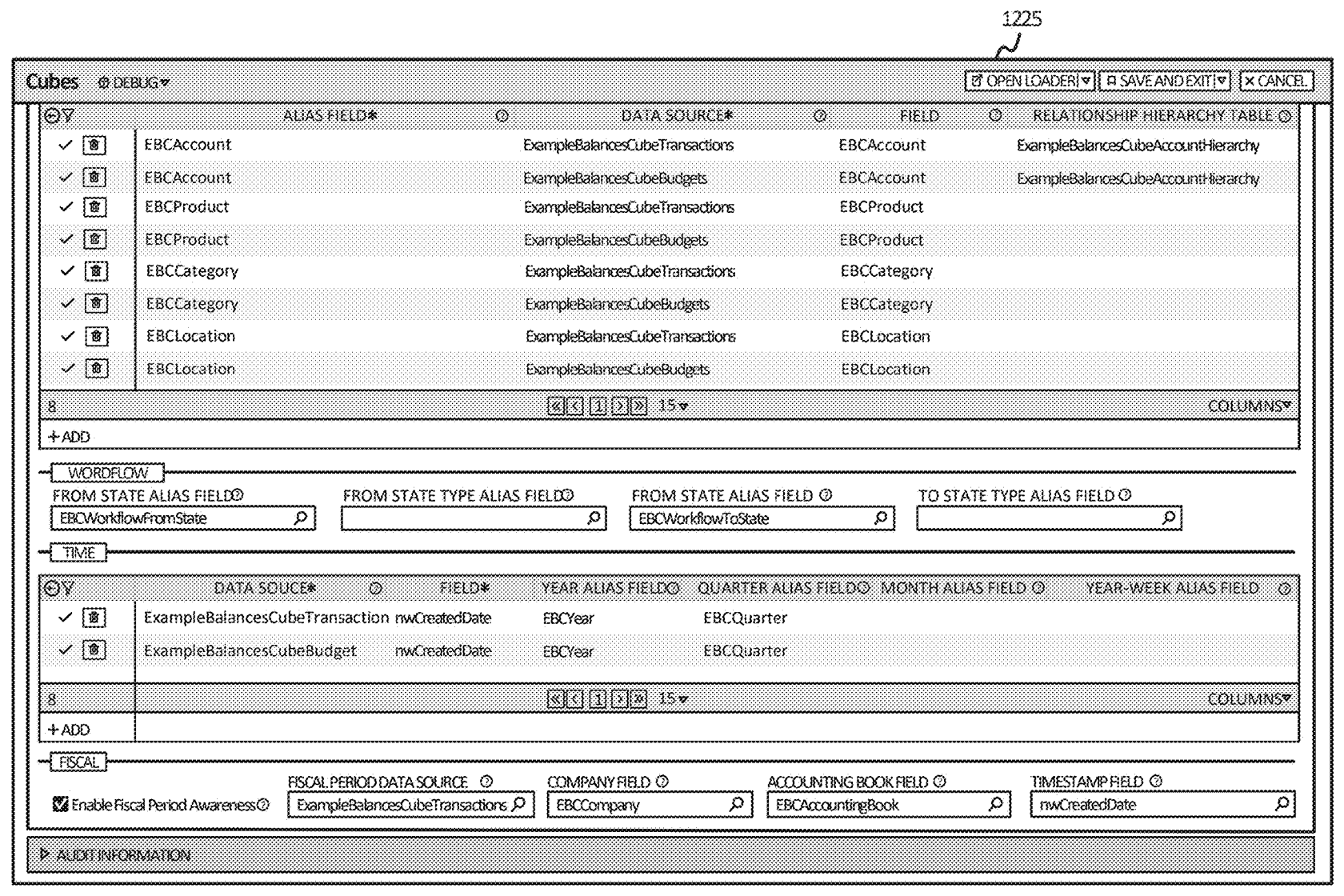

FIG. 12D shows view 1220 of a user interface of a no-code cube builder application. View 1220 includes a dimensions page in which literal dimensions of a cube are defined. View 1220 further includes an alias field in which the field of the output tables that should hold a dimension's value are specified. View 1220 further includes fields that specify where a dimension's value comes from in a specified data source. View 1225 of FIG. 12E includes more of the dimensions page in which more specific dimensions are defined. Workflow state dimensions summarize data by its workflow state such as pending, posted, draft, and the like. Time dimensions summarize data by various components of timestamps available on the data. The nwCreatedDate timestamp is always available on all data in the no-code development platform of the present example. Time dimensions can optionally be made aware of an organization's specific fiscal calendar by enabling fiscal period awareness functionality.

Figure 12F:
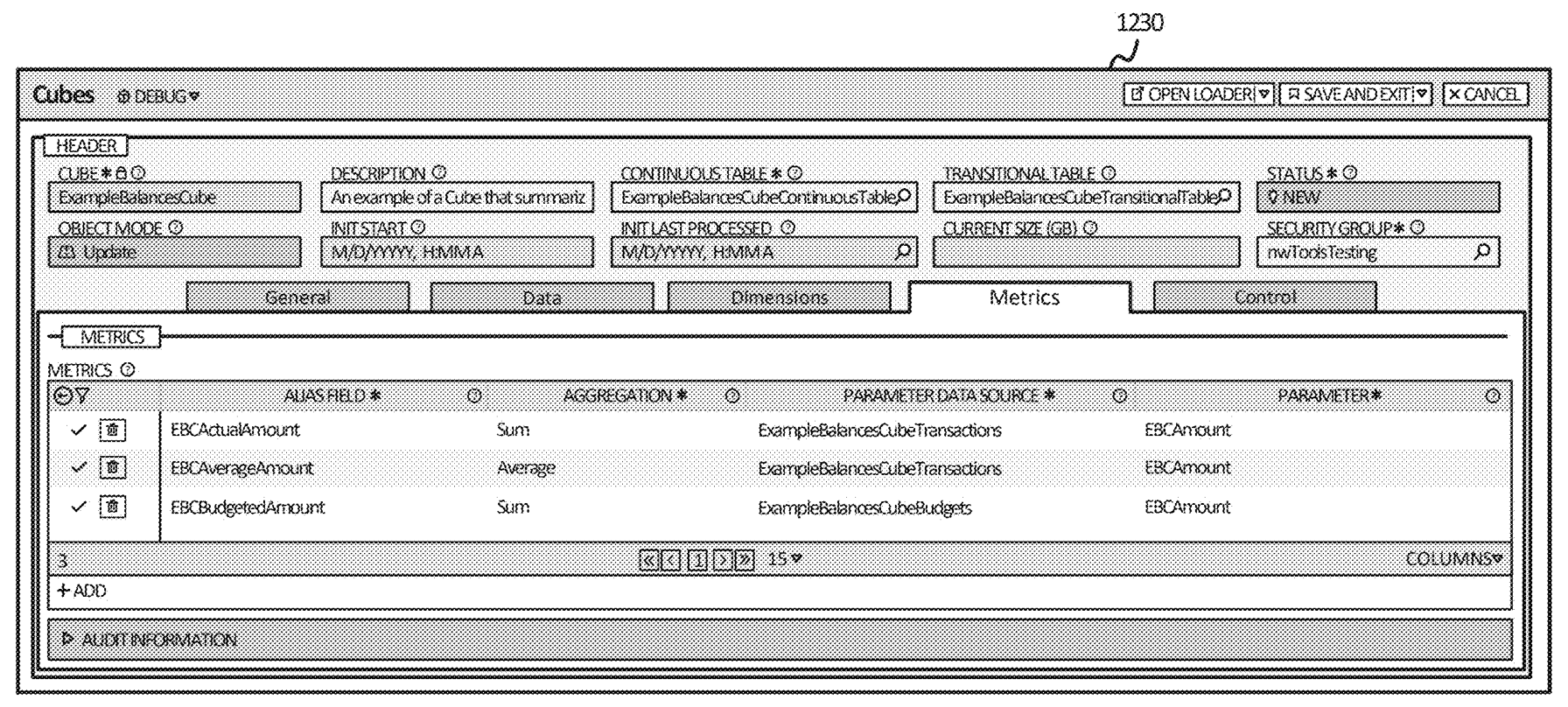
Figure 12H:
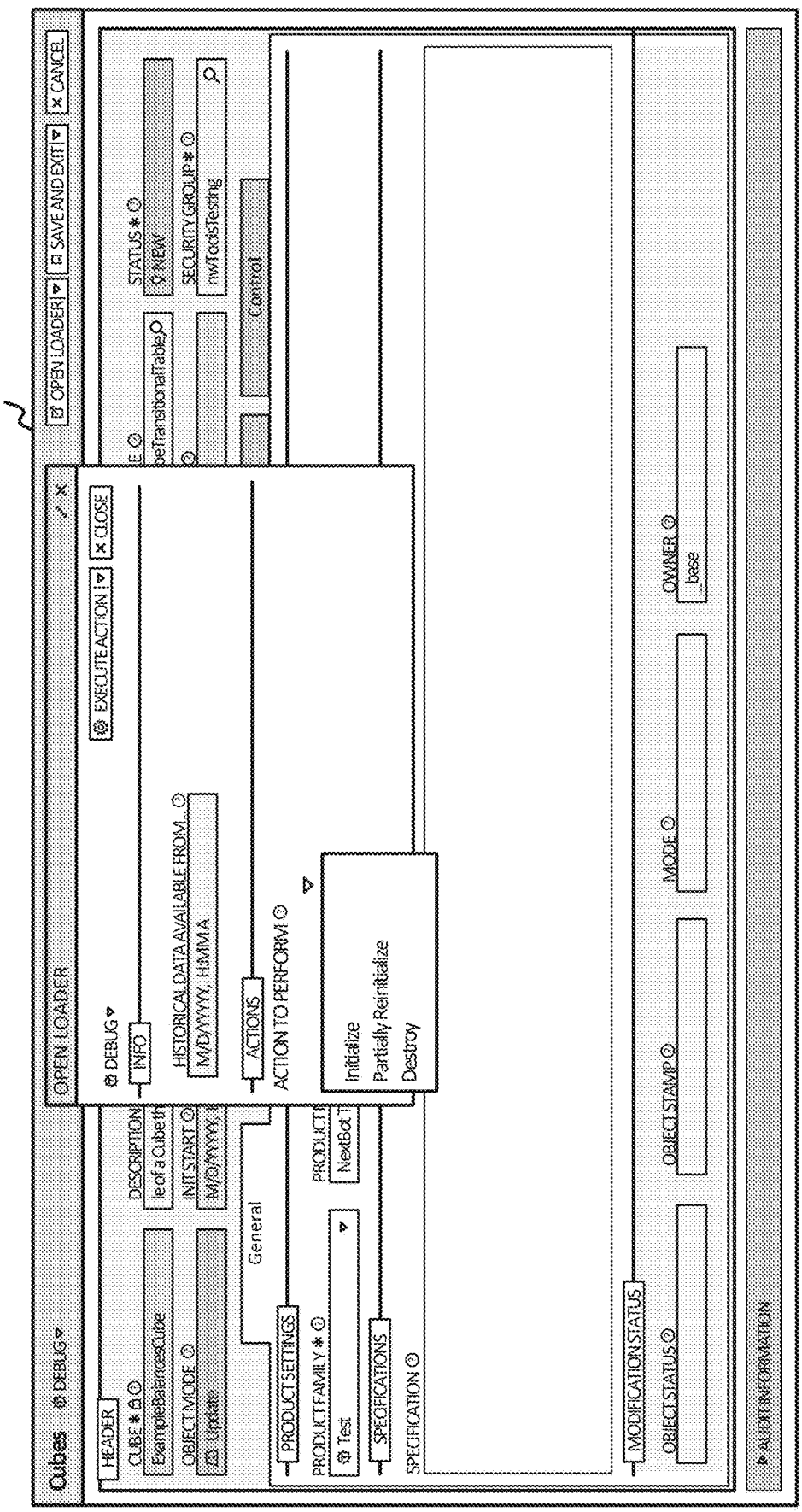

FIG. 12F includes view 1230 of the user interface in which the metrics page is displayed. The metrics page allows for metrics of a cube to be defined. Alias field is the field of the output tables that will hold the values of a metric for the cube. Aggregation is the aggregation function to use. The other fields of a given metric point the specified aggregation function to where its input data exists in the cube's data sources. FIG. 12G includes view 1235 of the user interface of the no-code cube builder application. View 1235 shows the control page of the application. The control page allows for the specification of events that, upon occurrence on a record of organizational data, should trigger an update to the cube's decisional data. An additive type indicates that the event should cause the record of organizational data in question to be added to the cube's decisional data. A subtractive type indicates that the event should case the record of organizational data in question to be removed from the cube's decisional data. FIG. 12H shows view 1240 of the user interface of the no-code cube builder application. View 1240 includes the cube loader miniature application (mini app). The cube loader mini app allows for a cube to be turned on or turned off.

In accordance with implementations of the data aggregation and summarization with cubes discussed herein, there are several manners in which valuable features may be built on top of the decisional data stored inside of cubes that are contemplated herein. Some features that may be built on top of the decisional data stored in cubes include predictive analytics such as leveraging artificial intelligence and/or machine learning techniques to form predictions, visualizations such as a new cube visualizer application, anomaly triggers such as sending an emergency notification if the average sales orders per hour spikes such that more resources may be recruited, no-code builder engine reports, and interfacing with third party online analytical processing database tools such as with the addition of an MDX (multidimensional expressions) interpreter on the cube query interface.

Furthermore, cubes may be modified to provide true complex metrics or filtered table lookups of data items. True complex metrics (i.e., formulas) may be implemented along with some user interface enhancements in order to create a greater user experience. User interface enhancement may include a formula component similar to the formula field in a spreadsheet application. There are a number of cases in the cubes application in which a data item of a given data source (i.e., table) must be specified. Instead of needing to define a table lookup on all data items, it may be advantageous to have a table lookup automatically filter down to only data items that exist on the table specified in another field of the application via the ability to filter table lookups on data items.

Figure 13:
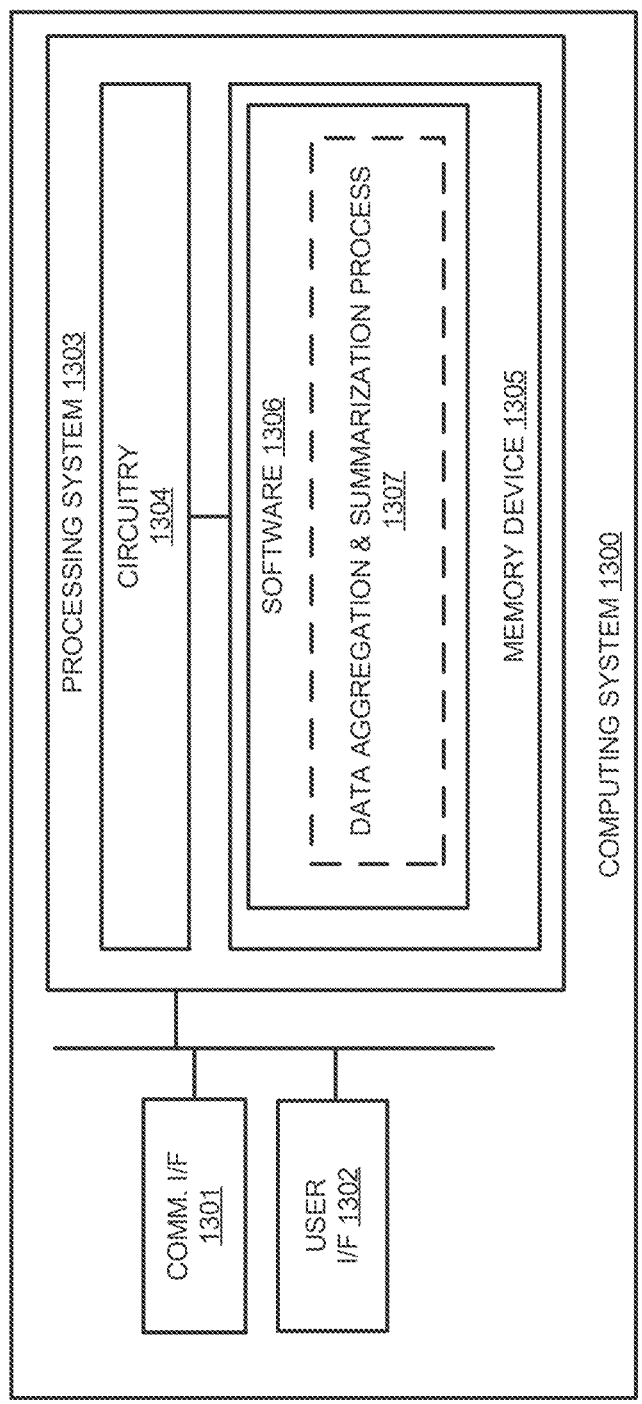
FIG. 13 is an example of a computing system in which some embodiments of the present technology may be utilized.

FIG. 13 illustrates computing system 1300 to perform data aggregation and summarization with cubes according to an implementation of the present technology. Computing system 1300 is representative of any computing system or collection of systems with which the various operational architectures, processes, scenarios, and sequences disclosed herein for aggregating and summarizing data may be employed. Computing system 1300 may be implemented as a single apparatus, system, or device or may be implemented in a distributed manner as multiple apparatuses, systems, or devices.

Computing system 1300 comprises communication interface 1301, user interface 1302, and processing system 1303. Processing system 1303 is linked to communication interface 1301 and user interface 1302. Processing system 1303 includes processing circuitry 1304 and memory device 1305 that stores operating software 1306. Computing system 1300 may include other well-known components such as batteries and enclosures that are not shown in the present example for clarity. Examples of computing system 1300 include, but are not limited to, desktop computers, laptop computers, server computers, routers, web servers, cloud computing platforms, and data center equipment, as well as any other type of physical or virtual server machines, physical or virtual routers, containers, and any variation or combination thereof.

Processing system 1303 loads and executes software 1306 from memory device 1305. Software 1306 includes and implements data aggregation and summarization process 1307, which is representative of the cube generation, cube querying, cube updating, and data aggregation and summarization processes discussed with respect to the preceding figures. When executed by processing system 1303 to perform the processes described herein, software 1306 directs processing system 1303 to operate as described for at least the various processes, operational scenarios, and sequences discussed in the foregoing implementations. Computing system 1300 may optionally include additional devices, features, or functionality not discussed for purposes of brevity.

Referring still to FIG. 13, processing system 1303 may comprise a micro-processor and other circuitry that retrieves and executes software 1306 from memory device 1305. Processing system 1303 may be implemented within a single processing device but may also be distributed across multiple processing devices or sub-systems that cooperate in executing program instructions. Examples of processing system 1303 include general purpose central processing units, graphical processing units, application specific processors, and logic devices, as well as any other type of processing devices, combinations, or variations thereof.

User interface 1302 comprises components that interact with a user to receive user inputs and to present media and/or information. User interface 1302 may include a speaker, microphone, buttons, lights, display screen, touch screen, touch pad, scroll wheel, communication port, or some other user input/output apparatus, including combinations thereof. User interface 1302 may be omitted in some examples.

Memory device 1305 may comprise any computer-readable storage media readable by processing system 1303 and capable of storing software 1306. Memory device 1305 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage media a propagated signal.

In addition to computer-readable storage media, in some implementations memory device 1305 may also include computer-readable communication media over which at least some of software 1306 may be communicated internally or externally. Memory device 1305 may be implemented as a single storage device but may also be implemented across multiple storage devices or sub-systems co-located or distributed relative to each other. Memory device 1305 may comprise additional elements, such as a controller, capable of communicating with processing system 1303 or possibly other systems.

Software 1306 (including data aggregation and summarization process 1307) may be implemented in program instructions and among other functions may, when executed by processing system 1303, direct processing system 1303 to operate as described with respect to the various operational scenarios, sequences, and processes illustrated herein. For example, software 1306 may include program instructions for implementing a cube query application or cube builder application as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1306 may include additional processes, programs, or components, such as operating system software, virtualization software, or other application software. Software 1306 may also comprise firmware or some other form of machine-readable processing instructions executable by processing system 1303.

In general, software 1306 may, when loaded into processing system 1303 and executed, transform a suitable apparatus, system, or device (of which computing system 1300 is representative) overall from a general-purpose computing system into a special-purpose computing system customized to provide a no-code development environment that includes cube building and cube querying processes as described herein. Indeed, encoding software 1306 on memory device 1305 may transform the physical structure of memory device 1305. The specific transformation of the physical structure may depend on various factors in different implementations of this description. Examples of such factors may include, but are not limited to, the technology used to implement the storage media of memory device 1305 and whether the computer-storage media are characterized as primary or secondary storage, as well as other factors.

For example, if the computer readable storage media are implemented as semiconductor-based memory, software 1306 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface 1301 may include communication connections and devices that allow for communication with other computing systems (not shown) over communication networks (not shown). Examples of connections and devices that together allow for inter-system communication may include network interface cards, ports, antennas, power amplifiers, radio frequency (RF) circuitry, transceivers, and other communication circuitry. The connections and devices may communicate over communication media to exchange communications with other computing systems or networks of systems, such as metal, glass, air, or any other suitable communication media. Communication interface 1301 may be configured to use Time Division Multiplex (TDM), Internet Protocol (IP), Ethernet, optical networking, wireless protocols, communication signaling, or some other communication format, including combinations thereof. The aforementioned media, connections, and devices are well known and need not be discussed at length here.

Communication between computing system 1300 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "platform," "environment," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A method of providing decisional data to endpoints, the method comprising:
    aggregating organizational data into a cube of decisional data, wherein the cube is a multidimensional dataset comprising:
        a continuous table formed from the organizational data, wherein the continuous table tracks changes to the organizational data such that data in the continuous table is an up to date representation of the organizational data; and
        a transitional table, distinct from the continuous table, formed from historical versions of the organizational data, wherein the transitional table tracks historical changes to the organizational data such that the transitional table is a representation of changes to the organizational data;
    receiving a cube query from an endpoint, wherein the cube query is related to at least one of the continuous table and the transitional table in the cube and comprises metadata defining a queried portion of the decisional data in the cube;
    generating cube query results, wherein the cube query results comprise a summary of the queried portion of the decisional data in the cube and the queried portion of the decisional data comprises data from one or more of the continuous table and the transitional table; and
    returning the cube query results to the endpoint as a summarized table.

2. The method of claim 1, wherein the decisional data comprises one or more metrics and one or more dimensions.

3. The method of claim 1, wherein the summarized table can be used to filter data and create subsets of the summary of the queried portion of the decisional data.

4. The method of claim 1, wherein:
    the continuous table comprises a current version of the organizational data such that rows of the continuous table are a current representation of defined metrics; and
    the transitional table comprises historical versions of organizational data records and tracks the historical changes to the organizational data that affect transitional dimensions.

5. The method of claim 1, wherein the summary of the queried portion of the decisional data comprises data from one of the continuous table and the transitional table.

6. The method of claim 1, further comprising:
    identifying a change to at least a portion of the organizational data; and
    in response to identifying the change to the at least a portion of the organizational data, updating at least one of the continuous table and the transitional table in the cube.

7. The method of claim 1, wherein the summary of the queried portion of the decisional data in the cube query results comprises a real-time view of the summary of the queried portion of the decisional data.

8. A system comprising:
    one or more computer-readable storage media;
    a processing system operatively coupled with the one or more computer-readable storage media; and
    program instructions stored on the one or more computer-readable storage media for providing decisional data to endpoints, wherein the program instructions, when read and executed by the processing system, direct the processing system to at least:
        aggregate organizational data into a cube of decisional data, wherein the cube is a multidimensional dataset comprising:
            a continuous table formed from the organizational data, wherein the continuous table tracks changes to the organizational data such that data in the continuous table is an up to date representation of the organizational data; and
            a transitional table, distinct from the continuous table, formed from historical versions of the organizational data, wherein the transitional table tracks historical changes to the organizational data such that the transitional table is a representation of changes to the organizational data;
        receive a cube query from an endpoint, wherein the cube query is related to at least a portion of the decisional data one of the continuous table and the transitional table in the cube and comprises metadata defining a queried portion of the decisional data the cube;
        generate cube query results, wherein the cube query results comprise a summary of the queried portion of the decisional data in the cube and the queried portion of the decisional data comprises data from one or more of the continuous table and the transitional table; and
        return the cube query results to the endpoint as a summarized table.

9. The system of claim 8, wherein the decisional data comprises one or more metrics and one or more dimensions.

10. The system of claim 8, wherein the summarized table can be used to filter data and create subsets of the summary of the queried portion of the decisional data.

11. The system of claim 8, wherein:
    the continuous table comprises a current version of the organizational data such that rows of the continuous table are a current representation of defined metrics; and
    the transitional table comprises historical versions of organizational data records and tracks the historical changes to the organizational data that affect transitional dimensions.

12. The system of claim 8, wherein the summary of the queried portion of the decisional data comprises data from one of the continuous table and the transitional table.

13. The system of claim 8, wherein the program instructions, when read and executed by the processing system, further direct the processing system to:
   identify a change to at least a portion of the organizational data; and
   in response to identifying the change to the at least a portion of the organizational data, update at least one of the continuous table and the transitional table in the cube.

14. The system of claim 8, wherein the summary of the queried portion of the decisional data in the cube query results comprises a real-time view of the summary of the queried portion of the decisional data.

15. One or more computer-readable storage media having program instructions stored thereon for providing decisional data to endpoints, wherein the program instructions, when read and executed by a processing system, direct the processing system to at least:
   aggregate organizational data into a cube of decisional data, wherein the cube is a multidimensional dataset comprising:
      a continuous table formed from the organizational data, wherein the continuous table tracks changes to the organizational data such that data in the continuous table is an up to date representation of the organizational data; and
      a transitional table, distinct from the continuous table, formed from historical versions of the organizational data, wherein the transitional table tracks historical changes to the organizational data such that the transitional table is a representation of changes to the organizational data;
   receive a cube query from an endpoint, wherein the cube query is related to at least a one of the continuous table and the transitional table in the cube and comprises metadata defining a queried portion of the decisional data the cube;
   generate cube query results, wherein the cube query results comprise a summary of the queried portion of the decisional data in the cube and the queried portion of the decisional data comprises data from one or more of the continuous table and the transitional table; and
   return the cube query results to the endpoint as a summarized table.

16. The one or more computer-readable storage media of claim 15, wherein the decisional data comprises one or more metrics and one or more dimensions.

17. The one or more computer-readable storage media of claim 15, wherein the summarized table can be used to filter data and create subsets of the summary of the queried portion of the decisional data.

18. The one or more computer-readable storage media of claim 15, wherein:
   the continuous table comprises a current version of the organizational data such that rows of the continuous table are a current representation of defined metrics; and
   the transitional table comprises historical versions of organizational data records and tracks the historical changes to the organizational data that affect transitional dimensions.

19. The one or more computer-readable storage media of claim 15, wherein the summary of the queried portion of the decisional data comprises data from one of the continuous table and the transitional table.

20. The one or more computer-readable storage media of claim 15, wherein the program instructions, when read and executed by the processing system, further direct the processing system to:
   identify a change to at least a portion of the organizational data; and
   in response to identifying the change to the at least a portion of the organizational data, update at least one of the continuous table and the transitional table in the cube.

* * * * *